US012707073B2

(12) United States Patent
Balakumar et al.

(10) Patent No.: US 12,707,073 B2
(45) **Date of Patent: *Aug. 11, 2026**

(54) STORING MISALIGNED REFERENCE PIXEL TILES

(71) Applicant: QUALCOMM Incorporated, San Diego, CA (US)

(72) Inventors: Sriganesh Balakumar, San Jose, CA (US); Kapil Garg, Fremont, CA (US); Gaurav Avinash Patil, San Jose, CA (US); Rajesh Chowdary Chitturi, San Jose, CA (US); Prasanth Gomatam, San Diego, CA (US); Sravan Kumar Gopanapalle, Valley Center, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/917,865

(22) Filed: Oct. 16, 2024

(65) Prior Publication Data

US 2025/0119563 A1 Apr. 10, 2025

Related U.S. Application Data

(63) Continuation of application No. 17/838,081, filed on Jun. 10, 2022, now Pat. No. 12,149,720.

(51) Int. Cl.

| | |
|---|---|
| ***H04N 19/423*** | (2014.01) |
| ***H04N 19/105*** | (2014.01) |
| ***H04N 19/167*** | (2014.01) |
| ***H04N 19/176*** | (2014.01) |

(52) U.S. Cl.

CPC ......... *H04N 19/423* (2014.11); *H04N 19/105* (2014.11); *H04N 19/167* (2014.11); *H04N 19/176* (2014.11)

(58) Field of Classification Search

CPC .. H04N 19/105; H04N 19/167; H04N 19/174; H04N 19/176; H04N 19/423; H04N 19/433

See application file for complete search history.

(56) References Cited

U.S. PATENT DOCUMENTS

| | | | |
|---|---|---|---|
| 10,375,416 | B1 | 8/2019 | Wenger et al. |
| 2007/0242077 | A1 | 10/2007 | Danan |
| 2007/0253491 | A1 | 11/2007 | Ito et al. |

(Continued)

OTHER PUBLICATIONS

International Search Report and Written Opinion—PCT/US2023/065004—ISA/EPO—Jun. 16, 2023.

*Primary Examiner* — Anner Holder

(74) *Attorney, Agent, or Firm* — Polsinelli LLP

(57) ABSTRACT

Systems and techniques are provided for caching misaligned pixel tiles. A method includes determining a first codec region including a first region of a frame; determining whether pixels of a first version of a pixel tile were stored in a cache while coding blocks from a second codec region, the pixel tile corresponding to a location within the frame; based on whether the pixels were stored in the cache, determining whether to read the first version of the pixel tile from the cache or retrieve a second version of the pixel tile from a memory device, the second version of the pixel tile including pixels from the first codec region that are not in the first version of the pixel tile; and coding a block based on the first version of the pixel tile read from the cache or second version of the pixel tile retrieved from the memory device.

22 Claims, 12 Drawing Sheets

(56) References Cited

U.S. PATENT DOCUMENTS

| | | | |
|---|---|---|---|
| 2013/0202044 | A1 | 8/2013 | Kitamura et al. |
| 2015/0010082 | A1 | 1/2015 | Iwata et al. |
| 2016/0065973 | A1 | 3/2016 | Cote et al. |
| 2021/0042890 | A1 | 2/2021 | Naidu et al. |
| 2023/0403404 | A1 | 12/2023 | Balakumar et al. |

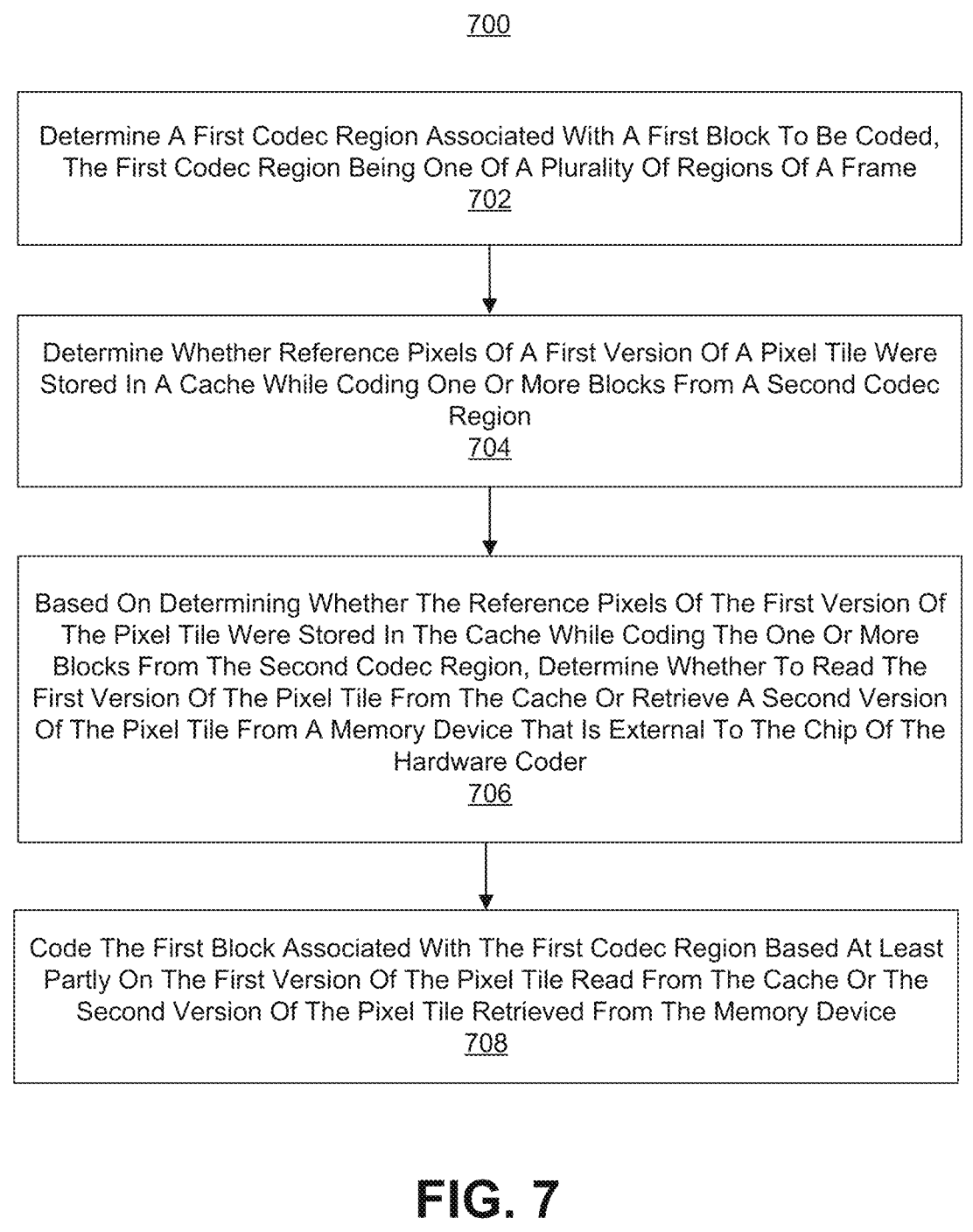

700

Determine A First Codec Region Associated With A First Block To Be Coded, The First Codec Region Being One Of A Plurality Of Regions Of A Frame
702

Determine Whether Reference Pixels Of A First Version Of A Pixel Tile Were Stored In A Cache While Coding One Or More Blocks From A Second Codec Region
704

Based On Determining Whether The Reference Pixels Of The First Version Of The Pixel Tile Were Stored In The Cache While Coding The One Or More Blocks From The Second Codec Region, Determine Whether To Read The First Version Of The Pixel Tile From The Cache Or Retrieve A Second Version Of The Pixel Tile From A Memory Device That Is External To The Chip Of The Hardware Coder
706

Code The First Block Associated With The First Codec Region Based At Least Partly On The First Version Of The Pixel Tile Read From The Cache Or The Second Version Of The Pixel Tile Retrieved From The Memory Device
708

FIG. 7

STORING MISALIGNED REFERENCE PIXEL TILES

CROSS-REFERENCE TO RELATED APPLICATION

This application is a Continuation of U.S. application Ser. No. 17/838,081, filed Jun. 10, 2022, which is hereby incorporated by reference, in its entirety and for all purposes.

TECHNICAL FIELD

The present application is generally related to video encoding and decoding. For example, aspects of the present disclosure relate to systems and techniques for storing (e.g., caching) misaligned reference pixel tiles.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, cellular or satellite radio telephones, mobile phones (e.g., so-called "smart phones"), video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. The large amount of video data needed to meet these demands places a burden on communication networks and devices that process and store the video data.

Digital video devices can implement video coding techniques to compress video data. Video coding can be performed according to one or more video coding standards or formats. For example, video coding standards or formats include versatile video coding (VVC), Essential Video Coding (EVC), high-efficiency video coding (HEVC), VP8, VP9, advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media and SMPTE 421 (also known as VC-1), among others. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding techniques with better coding efficiency are needed.

SUMMARY

Disclosed are systems, methods, and computer-readable media for caching misaligned reference pixel tiles. According to at least one example, a method is provided for encoding or decoding (coding) video data. The method may include: determining a first codec region associated with a first block to be coded, the first codec region being one of a plurality of codec regions of a frame, wherein each codec region among the plurality of codec regions of the frame is independently codable; determining whether reference pixels of a first version of a pixel tile were stored in a cache while coding one or more blocks from a second codec region, wherein the cache is hosted locally on a chip of a hardware coder, and wherein the pixel tile corresponds to a location within the frame; based on determining whether the reference pixels of the first version of the pixel tile were stored in the cache while coding the one or more blocks from the second codec region, determining whether to read the first version of the pixel tile from the cache or retrieve a second version of the pixel tile from a memory device that is external to the chip of the hardware coder, wherein the second version of the pixel tile comprises reference pixels from the first codec region that are not in the first version of the pixel tile; and coding the first block associated with the first codec region based at least partly on the first version of the pixel tile read from the cache or the second version of the pixel tile retrieved from the memory device.

In another example, an apparatus for encoding or decoding (coding) video data is provided that includes at least one memory and at least one processor (e.g., configured in circuitry) coupled to the at least one memory. The at least one processor is configured to: determine a first codec region associated with a first block to be coded, the first codec region being one of a plurality of codec regions of a frame, wherein each codec region among the plurality of codec regions of the frame is independently codable; determine whether reference pixels of a first version of a pixel tile were stored in a cache while coding one or more blocks from a second codec region, wherein the cache is hosted locally on a chip of a hardware coder, and wherein the pixel tile corresponds to a location within the frame; based on determining whether the reference pixels of the first version of the pixel tile were stored in the cache while coding the one or more blocks from the second codec region, determine whether to read the first version of the pixel tile from the cache or retrieve a second version of the pixel tile from a memory device that is external to the chip of the hardware coder, wherein the second version of the pixel tile comprises reference pixels from the first codec region that are not in the first version of the pixel tile; and code the first block associated with the first codec region based at least partly on the first version of the pixel tile read from the cache or the second version of the pixel tile retrieved from the memory device.

In another example, a non-transitory computer-readable medium is provided that has stored thereon instructions that, when executed by one or more processors, cause the one or more processors to: determine a first codec region associated with a first block to be coded, the first codec region being one of a plurality of codec regions of a frame, wherein each codec region among the plurality of codec regions of the frame is independently codable; determine whether reference pixels of a first version of a pixel tile were stored in a cache while coding one or more blocks from a second codec region, wherein the cache is hosted locally on a chip of a hardware coder, and wherein the pixel tile corresponds to a location within the frame; based on determining whether the reference pixels of the first version of the pixel tile were stored in the cache while coding the one or more blocks from the second codec region, determine whether to read the first version of the pixel tile from the cache or retrieve a second version of the pixel tile from a memory device that is external to the chip of the hardware coder, wherein the second version of the pixel tile comprises reference pixels from the first codec region that are not in the first version of the pixel tile; and code the first block associated with the first codec region based at least partly on the first version of the pixel tile read from the cache or the second version of the pixel tile retrieved from the memory device.

In another example, an apparatus for encoding or decoding (coding) video data is provided. The apparatus includes: means for determining a first codec region associated with a first block to be coded, the first codec region being one of a plurality of codec regions of a frame, wherein each codec region among the plurality of codec regions of the frame is independently codable; means for determining whether reference pixels of a first version of a pixel tile were stored in a cache while coding one or more blocks from a second codec region, wherein the cache is hosted locally on a chip of a hardware coder, and wherein the pixel tile corresponds to a location within the frame; means for determining, based on determining whether the reference pixels of the first version of the pixel tile were stored in the cache while coding the one or more blocks from the second codec region, whether to read the first version of the pixel tile from the cache or retrieve a second version of the pixel tile from a memory device that is external to the chip of the hardware coder, wherein the second version of the pixel tile comprises reference pixels from the first codec region that are not in the first version of the pixel tile; and means for coding the first block associated with the first codec region based at least partly on the first version of the pixel tile read from the cache or the second version of the pixel tile retrieved from the memory device.

In some aspects, one or more of the apparatuses described above is, can be part of, or can include a mobile device, a camera device, an encoder, a decoder, an Internet-of-Things (IoT) device, and/or an extended reality (XR) device (e.g., a virtual reality (VR) device, an augmented reality (AR) device, or a mixed reality (MR) device). In some aspects, the apparatus includes a camera device. In some examples, the apparatuses can include or be part of a vehicle, a mobile device (e.g., a mobile telephone or so-called “smart phone” or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 7 is a flowchart illustrating an example process 700 for caching misaligned pixel tiles, in accordance with some examples of the disclosure;

DETAILED DESCRIPTION

Figure 1:
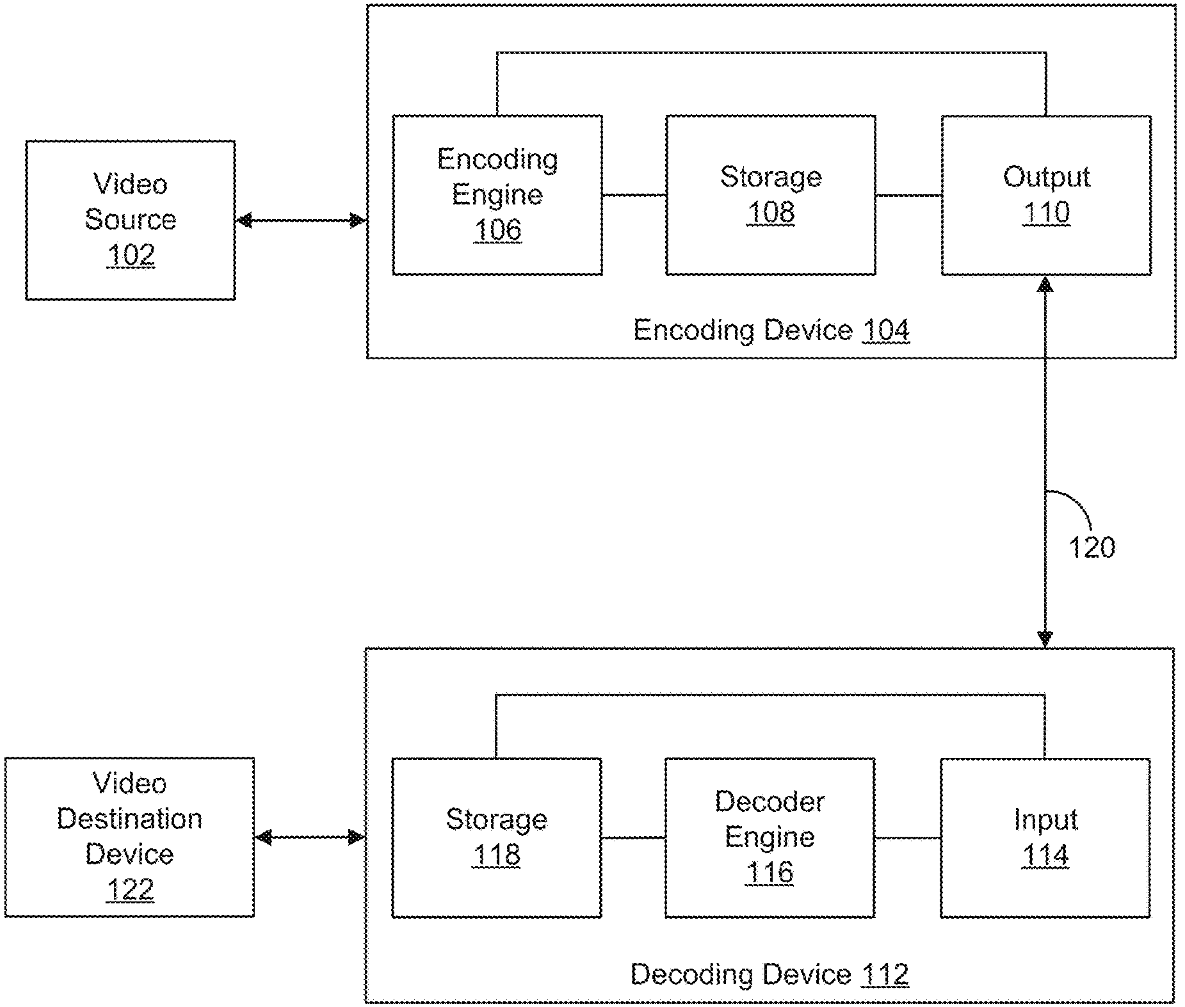
FIG. 1 is a block diagram illustrating an example of an encoding device and a decoding device, in accordance with some examples of the disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides examples only, and is not intended to limit the scope, applicability, or configuration of the disclosure. Rather, the ensuing description of the examples of the disclosure will provide those skilled in the art with an enabling description for implementing an example of the disclosure. It should be understood that various changes may be made in the function and arrangement of elements without departing from the scope of the application as set forth in the appended claims.

As previously explained, digital video devices can implement video coding techniques to compress video data. Video coding can be performed according to one or more video coding standards or formats. For example, video coding standards or formats include versatile video coding (VVC), Essential Video Coding (EVC), high-efficiency video coding (HEVC), VP8, VP9, advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media and SMPTE 421 (also known as VC-1), among others. Video coding generally utilizes prediction methods that leverage redundancy present in video images or sequences. A goal of video coding techniques is to compress video data into a form that uses a lower bit rate, while avoiding or minimizing degradations to video quality.

Video compression techniques used in video coding can include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units. These video blocks may be encoded using a particular prediction mode.

Motion compensation is generally used in the coding of video data for video compression. In some examples, motion compensation can include and/or implement an algorithmic technique used to predict a frame in a video based on the previous and/or future frames of the video, by accounting for motion of the camera and/or elements (e.g., objects, etc.) in the video. Motion compensation can describe a picture in terms of the transformation of a reference picture to the current picture. The reference picture may be a picture that is previous in time or even from the future. In some examples, motion compensation can improve compression efficiency by allowing images to be accurately synthesized from previously transmitted and/or stored images.

One example of a motion compensation technique includes block motion compensation (BMC), also referred to as motion-compensated discrete cosine transform (MC DCT), where frames are partitioned into non-overlapping blocks of pixels and each block is predicted from one or more blocks in one or more reference frames. In BMC, the blocks are shifted to the position of the predicted block. Such shift is represented by a motion vector (MV) or motion compensation vector. To exploit the redundancy between neighboring block vectors, BMC may be used to encode only the difference between the current and previous motion vector in a video bitstream.

Generally, in BMC, a current reconstructed block is composed of the predicted block from the previous frame (e.g., referenced by the motion vectors) and the residual data transmitted in the bitstream for the current block. Another example of a motion compensation technique includes overlapped block motion compensation (OBMC). OBMC can increase prediction accuracy and avoid blocking artifacts. In OBMC, the prediction can be or include a weighted sum of multiple predictions. Moreover, blocks can be larger in each dimension and can overlap quadrant-wise with neighboring blocks. Thus, each pixel may belong to multiple blocks. For example, in some illustrative cases, each pixel may belong to 4 blocks. In such a scheme, OBMC may implement 4 predictions for each pixel which are summed up to a weighted mean.

In some video coding standards or schemes, to decode a frame (e.g., a current frame being decoded), a video engine pre-fetches a previously-decoded frame (e.g., a previous frame) or block and uses the previous frame or block as a reference frame or block for the new frame or block being decoded (e.g., the current frame). In some cases, the video engine may include a hardware coder (e.g., encoder, decoder, or combined encoder-decoder or codec) configured to encode and/or decode video data. When the video engine pre-fetches the previous frame or block, the video engine can cache pixels of the previous frame or block for faster access from cache memory (e.g., relative to access from a storage device such as an external Random-Access Memory (RAM) device).

In some examples, the video engine can fetch pixels of one or more frames (e.g., a current frame being coded, a previously-coded frame, etc.) in blocks of pixels, with each block of pixels referred to herein as a "pixel tile". A pixel tile may include a region of a pre-defined size, such as a region having a size of 32×16 (representing 32 pixels wide and 16 pixels high), 64×32, 128×64, 32×32, 64×64, 128×128 or other size. The video engine can retrieve the pixel tiles from memory (e.g., random access memory (RAM) or other memory) and store the pixel tiles in the reference cache for future use (e.g., future reads). In some cases, the memory may be stored externally from a chip of the video engine (e.g., hardware coder). In some examples, the cache may be stored locally on the chip of the video engine (e.g., hardware coder). The video engine can store the pixel tiles in the reference cache along with a tag indicating the location of the pixel tile within the reference frame. For example, the video engine can store a pixel tile along with a tag indicating the X and Y location coordinates of the pixel tile in the reference frame.

When the video engine determines to read/retrieve a pixel tile from the reference cache, the video engine can provide the location of the pixel tile (e.g., the X and Y location coordinates) to indicate which pixel tile the video engine wants to read/retrieve from the reference cache. For example, the video engine can read/retrieve a pixel tile from the reference cache based on the X and Y location coordinates of the pixel tile the video engine seeks to read/retrieve from the reference cache. To identify the requested pixel tile in the reference cache, the location of the pixel tile provided by the video engine (e.g., via a read or retrieve query) can be compared to the locations identified in the tags of the pixel tiles in the reference cache. When the location of the pixel tile provided by the video engine matches the location identified in a tag of a pixel tile in the reference cache, the pixel tile in the reference cache associated with the tag having the matching location can be read out and sent to the video engine for processing.

In some examples, the video engine can decode a frame one codec region at a time. A codec region refers to a partition of pixels within a frame used when coding (e.g., encoding and/or decoding) the frame. Each codec region may be encoded or decoded independently from other codec regions. Illustrative examples of codec regions include codec tiles (or tiles), slices, or other partition of a video frame (e.g., any independently codable partition of a video frame). For example, when a frame is encoded, the entire frame may not be encoded as a single structure because of the complexity, for example, of searching through the entire frame in order to encode the frame. Instead, the frame can be partitioned into codec regions, and encoded (or decoded) by codec regions (e.g., each codec region being coded independently from one another). In some cases, a codec region can be larger than a pixel tile (e.g., a block of cached pixels of a frame). However, in other cases, a codec region can be the same size as a pixel tile or any other size.

Intra-block copy (IBC) is a video coding mode where the video engine may code (e.g., encode and/or decode) a current block of video data in a picture using one or more blocks of previously coded video data that are within the same frame or picture as the current block. For instance, the video engine can use a frame that is being decoded as a reference frame for coding that frame. In some cases, the one or more blocks of previously coded video data are either directly above or directly in line horizontally with (e.g., to the left of) the current block of video data.

In some aspects, IBC mode may utilize a reference cache, where the video engine can retrieve pixel tiles of a frame or picture from memory (e.g., random access memory (RAM) or other memory) and store the pixel tiles in the reference cache for future use (e.g., future reads) in coding other pixel tiles of the frame or picture (or pixel tiles of other frames or pictures). As previously noted, in some examples, the video engine can code (e.g., encode or decode) each codec region of the frame independently, for example, one codec region at a time. However, in some cases, a pixel tile (which may be of a pre-defined size as noted above) in the frame may be "misaligned" in the reference cache and/or with respect to the codec regions used to partition, encode, and/or decode the frame. For example, in some cases, pixel data of a misaligned pixel tile in a frame is part of or included within multiple codec regions of the frame. In such cases, when the video engine is coding a first codec region containing a portion of a pixel tile and the remaining portion of the pixel tile is located in a second codec region, the pixel tile may only include pixels from the first codec region (and not pixels from the second codec region) when added to the reference cache due to the codec regions being independently decodable (e.g., the first codec region is decoded before the second codec region, resulting in the pixels from the second codec region not yet being coded when blocks of the first codec region are being decoded). Such a pixel tile is referred to herein as a "partial pixel tile" or "partial tile." For instance, the video engine may fetch a partial pixel tile from memory and cache the partial pixel tile in the reference cache, in which case the partial pixel tile is partially filled (with the pixels from the first codec region and not the pixels from the second codec region) when added to the reference cache. When the video engine is coding (e.g., encoding or decoding) a block within the second codec region that references a portion of the second codec region containing the remaining portion of the pixel tile (including the pixels of the second codec region that were not included in the partial pixel tile when the partial pixel tile is added to the reference cache), the video engine may obtain the partial pixel tile from the reference cache to perform coding of the block of the second codec region. However, because the pixels from the second codec region were not included in the partial pixel tile when the partial pixel tile was added to the reference cache, the partial pixel tile cannot be used to code the block of the second codec region.

In one illustrative example, a first set of pixels of a pixel tile may reside in a first codec region and a second set of pixels of the pixel tile may reside in a second codec region that is adjacent to the first codec region. In such cases, when the video engine is coding the first codec region (e.g., coding a block or other coding structure/construct contained within the first codec region) containing the first set of pixels of the pixel tile, the pixel tile may only be partially filled with the first set of pixels of the pixel tile (e.g., from the first codec region). The video engine may fetch the partial pixel tile (e.g., including the first set of pixels) and cache only the partial pixel tile in the reference cache. Thus, when the video engine is coding a block of the second codec region referencing pixels in the second set of pixels of the second codec region, the video engine may obtain the partial pixel tile (e.g., including the first set of pixels) with a remaining portion of stale or incomplete data of the partial pixel tile corresponding to the second set of pixels of the pixel tile contained in the second codec region.

Systems, apparatuses, methods, and computer-readable media (collectively referred to as "systems and techniques" hereinafter) are described herein for caching misaligned reference pixel tiles in intra-block copy frames. In some examples, the systems and techniques described herein can ensure that partial tiles can be cached, read/retrieved, and "refreshed" (e.g., by retrieving all pixels of the pixel tile from a reference cache) each time a new codec region associated with invalid pixel data (e.g., stale or incomplete pixel data that was cached in the reference cache during coding of a different codec region) is coded. In some examples, the systems and techniques described herein can assign each codec region in a reference frame a number sequentially in a particular order such as, for example a raster scan order. To read/retrieve pixel tile data, a video engine can generate a query that provides information (e.g., an indication such as a "tag") indicating the location (e.g., address such as X and Y coordinates) of the requested pixel tile data, as previously explained. In addition to providing the location of the requested pixel tile data within the reference frame, the tag can also indicate the codec region associated with the pixel tile data. Thus, if a pixel tile includes pixels in multiple codec regions, the tag can indicate the corresponding codec region and location within the reference frame for each portion of the pixel tile contained within a different codec region. The use of such tags can allow the video engine to cache, read/retrieve, and refresh partial tiles each time a new codec region is decoded.

To illustrate, if a first set of pixels of a pixel tile resides in a first codec region and a second set of pixels of the pixel tile resides in a second codec region that is adjacent to the first codec region, when the video engine determines to read/retrieve the first set of pixels residing in the first codec region, the video engine can provide a query with a tag that identifies the first codec region in which the first set of pixels reside, as well as the location (e.g., address) of the first set of pixels within the reference frame. Similarly, when the video engine determines to read/retrieve the second set of pixels residing in the second codec region, the video engine can provide a query with a tag that identifies the second codec region in which the second set of pixels reside, as well as the location (e.g., address) of the second set of pixels within the reference frame.

As illustrated above, when the video engine determines to read/retrieve a pixel tile (or a portion of a pixel tile residing in a codec region), the video engine can provide a tag in a read/retrieve query that identifies codec region information (e.g., corresponding to the codec region that was being coded when the pixel tile was stored in the reference cache) along with the address/location of the pixel tile data being requested. For any pixel tile or portion of a pixel tile contained in a particular codec region, the reference cache can store, in an associated tag, the codec region information along with the location (e.g., address and/or coordinates) of the pixel tile data. The codec region information can include, for example and without limitation, a codec region number, a codec region address, a codec region identifier, a codec region description, and/or any other codec region information.

When the video engine checks a tag to determine if corresponding pixel tile data is contained in the reference cache, the video engine can compare the codec region information in the tag as well as the address information (e.g., which identifies the location of the pixel tile data being requested) in the tag with the codec region information and address information in each of the tags in the reference cache. If both the codec region information and the address information in the tag match the codec region information and the address information in a tag in the reference cache, the query returns a hit (e.g., a match). If the query returns a hit, the video engine can read/retrieve the requested pixel tile data from the reference cache. On the other hand, if the codec region information and/or the address information in the tag do/does not match the codec region information and/or the address information in a tag in the reference cache, the query returns miss. If the query returns a miss, the video engine can read/retrieve the requested pixel tile data from a memory device and refresh the partial pixel tile by storing the retrieved pixel tile in the reference cache with the codec region information and/or the address information. The memory device is different/separate from the reference cache. For example, the memory device may be an external memory device and/or a Random-Access Memory (RAM) device (e.g., Static RAM (SRAM), Synchronous RAM (SDRAM), Double Data Rate SDRAM (DDR SDRAM), etc.) that is not local to the video engine (e.g., a hardware coder). In other words, the memory device is considered off-chip memory relative to the video engine.

As illustrated above, the systems and techniques described herein can ensure that partial tiles can be cached, read/retrieved, and refreshed each time a new codec region is decoded. Further details regarding the systems and techniques will be described with respect to the figures.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoding device 104 and decoding device 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoding device 104 may further partition a superblock into smaller coding blocks. Encoding device 104 may partition a superblock and other coding blocks into smaller blocks using square or non-square partitioning. Non-square blocks may include N/2×N, N×N/2, N/4×N, and N×N/4 blocks. Encoding device 104 and decoding device 112 may perform separate prediction and transform processes on each of the coding blocks.

AV1 also defines a tile of video data. A tile is a rectangular array of superblocks that may be coded independently of other tiles. That is, encoding device 104 and decoding device 112 may encode and decode, respectively, coding blocks within a tile without using video data from other tiles. However, encoding device 104 and decoding device 112 may perform filtering across tile boundaries. Tiles may be uniform or non-uniform in size. Tile-based coding may enable parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning, QTBT partitioning, MTT partitioning, superblock partitioning, or other partitioning structure.

In some cases, the encoder engine 106 and decoder engine 116 may be configured to operate according to another video coding standard such as, for example, HEVC. According to HEVC, a video coder (such as encoder engine 106 and/or decoder engine 116) partitions each picture into one or multiple slices. Each slice can be independent of other slices in the sense that the information carried in the slice can be coded without any dependency on data from other slices within the same picture. A slice can include one or multiple slice segments, where the first slice segment of a slice is called an independent slice segment and is independent of other slice segments. The subsequent slice segments, if any, are called dependent slice segments since they depend on previous slice segments.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

Intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction can be indexed. In other examples, more intra modes may be defined including prediction angles that may not already be represented by the 33 angular modes. In other examples, the prediction angles associated with the angular modes may be different from those used in HEVC.

Inter-picture prediction uses the temporal correlation between pictures in order to derive a motion-compensated prediction for a block of image samples. Using a translational motion model, the position of a block in a previously decoded picture (a reference picture) can be indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame.

Accuracy of motion vectors may be expressed by the quantization level of the motion vectors. For example, the quantization level may be an integer accuracy (e.g., 1-pixel) or fractional-pel accuracy (e.g., ¼-pixel, ½-pixel, or other sub-pixel value). Interpolation can be applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters (e.g., $\Delta x_0$, $y_0$, $refIdx_0$ and $\Delta x_1$, $y_1$, $refIdx_1$) can be used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. The data connection may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture, in which case all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that the motion vector has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, such a situation typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, the MB can have only one motion vector for each MB partition in each direction. In some cases, when an MB is partitioned into four 8×8 MB partitions, each 8×8 MB partition can be further partitioned into subblocks, in which case each subblock can have a different motion vector in each direction. In some examples, there are four different ways to get subblocks from an 8×8 MB partition, including: one 8×8 sub-block; two 8×4 subblocks; two 4×8 subblocks; and four 4×4 subblocks. Each subblock can have a different motion vector in each direction. Therefore, a motion vector is present in a level equal to higher than subblock.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC for example, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, one or more scaling window offsets can be included along with stored motion vectors in a MV candidate list.

In examples where a MV candidate list is used for motion prediction of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g., information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figures 2A, 2B:
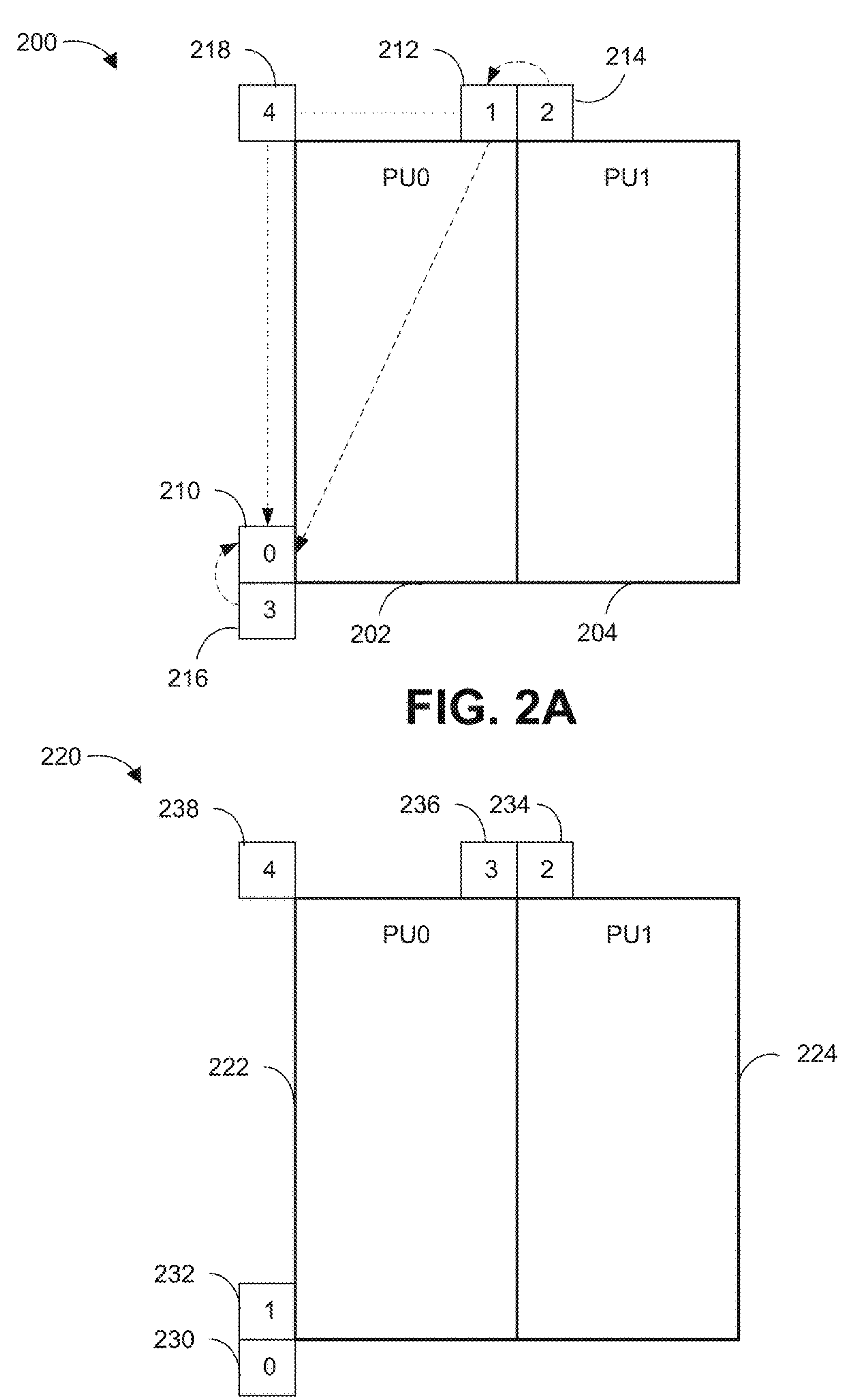
FIG. 2A is a conceptual diagram illustrating example spatial neighboring motion vector candidates for a merge mode, in accordance with some examples of the disclosure.
FIG. 2B is a conceptual diagram illustrating example spatial neighboring motion vector candidates for an advanced motion vector prediction (AMVP) mode, in accordance with some examples of the disclosure.

The candidates for both modes can be derived from spatial and/or temporal neighboring blocks. For example, FIG. 2A and FIG. 2B include conceptual diagrams illustrating spatial neighboring candidates. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder can form a merging candidate list by considering merging candidates from various motion data positions. For example, as shown in FIG. 2A, up to five spatial MV candidates can be derived with respect to spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4). In FIG. 2A, block 200 includes PU0 202 and PU1 204. In some examples, when a video coder is to code motion information for PU0 202 using merge mode, the video coder can add motion information from spatial neighboring block 210, spatial neighboring block 212, spatial neighboring block 214, spatial neighboring block 216, and spatial neighboring block 218 to a candidate list, in the order described above.

In AVMP mode shown in FIG. 2B, the neighboring blocks are divided into two groups: left group including the blocks 0 and 1, and above group including the blocks 2, 3, and 4. In FIG. 2B, the blocks 0, 1, 2, 3, and 4 are labeled, respectively, as blocks 230, 232, 234, 236, and 238. Here, block 220 includes PU0 222 and PU1 224, and blocks 230, 232, 234, 236, and 238 represent spatial neighbors to PU0 222. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
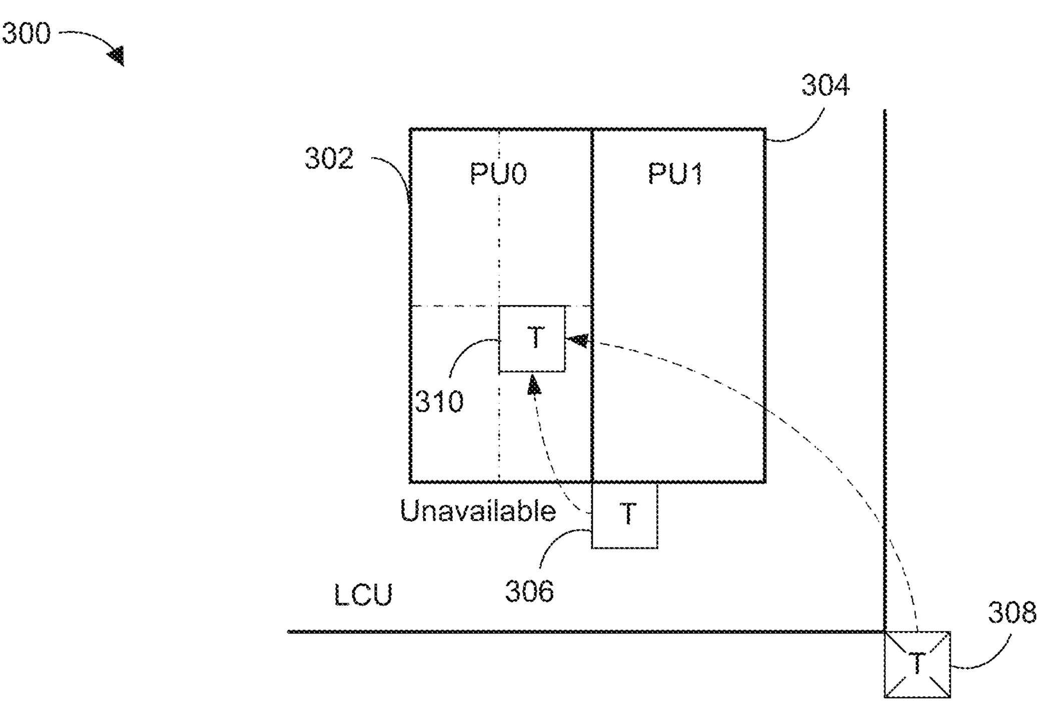
FIG. 3A is a conceptual diagram illustrating an example temporal motion vector predictor (TMVP) candidate, in accordance with some examples of the disclosure.
Figure 3B:
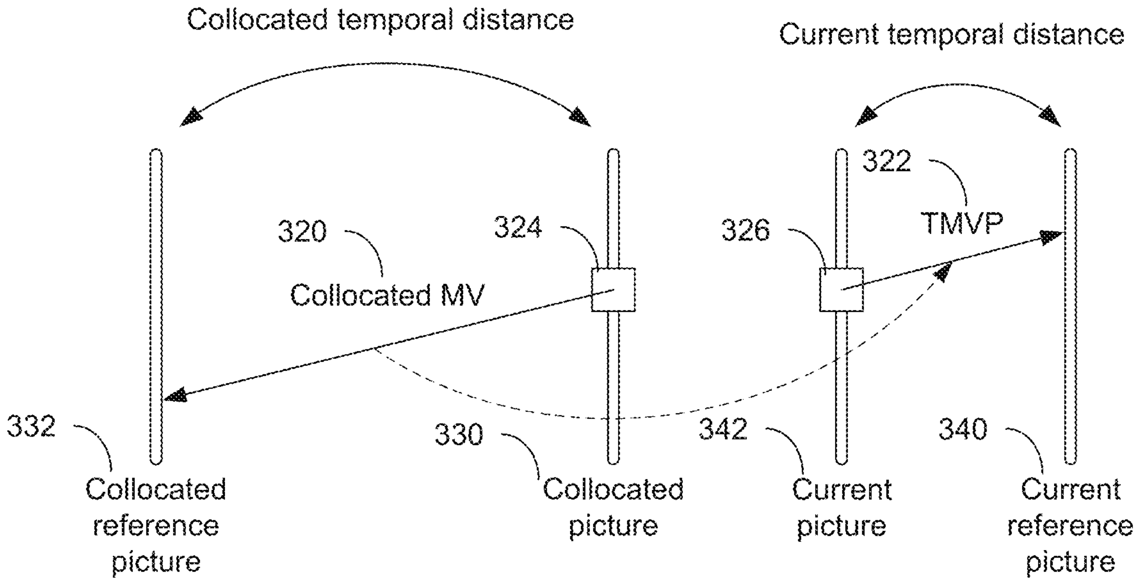
FIG. 3B is a conceptual diagram illustrating an example of motion vector scaling, in accordance with some examples of the disclosure.

FIG. 3A and FIG. 3B include conceptual diagrams illustrating temporal motion vector prediction. FIG. 3A illustrates an example CU 300 including PU0 302 and PU1 304. PU0 302 includes a center block 310 for PU0 302 and a bottom-right block 306 to PU0 302. FIG. 3A also shows an external block 308 for which motion information may be predicted from motion information of PU0 302, as discussed below. FIG. 3B illustrates a current picture 342 including a current block 326 for which motion information is to be predicted. FIG. 3B also illustrates a collocated picture 330 to current picture 342 (including collocated block 324 to current block 326), a current reference picture 340, and a collocated reference picture 332. Collocated block 324 is predicted using collocated motion vector 320, which is used as a temporal motion vector predictor (TMVP) candidate 322 for motion information of current block 326.

A video coder can add a temporal motion vector predictor (TMVP) candidate (e.g., TMVP candidate 322), if enabled and available, into a MV candidate list after any spatial motion vector candidates. The process of motion vector derivation for a TMVP candidate is the same for both merge and AMVP modes. In some instances, however, the target reference index for the TMVP candidate in the merge mode is always set to zero.

The primary block location for TMVP candidate derivation is the bottom right block 306 outside of the collocated PU 304, as shown in FIG. 3A, to compensate for the bias to the above and left blocks used to generate spatial neighboring candidates. However, if block 306 is located outside of the current CTB (or LCU) row (e.g., as illustrated by block 308 in FIG. 3A) or if motion information for block 306 is not available, the block is substituted with center block 310 of PU 302.

With reference to FIG. 3B, a motion vector for TMVP candidate 322 can be derived from collocated block 324 of collocated picture 330, indicated in the slice level. Similar to temporal direct mode in AVC, a motion vector of the TMVP candidate may be subject to motion vector scaling, which is performed to compensate for distance differences between current picture 342 and current reference picture 340, and collocated picture 330 and collocated reference picture 332. That is, motion vector 320 can be scaled to produce TMVP candidate 322 based on the distance differences between a current picture (e.g., current picture 342) and a current reference picture (e.g., current reference picture 340), and a collocated picture (e.g., collocated picture 330) and a collocated reference picture (e.g., collocated reference picture 332).

Other aspects of motion prediction are covered in the HEVC standard and/or other standard, format, or codec. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. Moreover, the motion vector can be scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

In some implementations, a pruning process can be performed when adding or inserting new candidates into an MV candidate list. For example, in some cases it is possible for MV candidates from different blocks to include the same information. In such cases, storing duplicative motion information of multiple MV candidates in the MV candidate list can lead to redundancy and a decrease in the efficiency of the MV candidate list. In some examples, the pruning process can eliminate or minimize redundancies in the MV candidate list. For example, the pruning process can include comparing a potential MV candidate to be added to an MV candidate list against the MV candidates which are already stored in the MV candidate list. In one illustrative example, the horizontal displacement ($\Delta x$) and the vertical displacement ($\Delta y$) (indicating a position of a reference block relative to a position of the current block) of a stored motion vector can be compared to the horizontal displacement ($\Delta x$) and the vertical displacement ($\Delta y$) of the motion vector of a potential candidate. If the comparison reveals that the motion vector of the potential candidate does not match any of the one or more stored motion vectors, the potential candidate is not considered as a candidate to be pruned and can be added to the MV candidate list. If a match is found based on the comparison, the potential MV candidate is not added to the MV candidate list, avoiding the insertion of an identical candidate. In some cases, to reduce complexity, only a limited number of comparisons are performed during the pruning process instead of comparing each potential MV candidate with all existing candidates.

In certain coding schemes, such as HEVC, weighted prediction (WP) is supported, in which case a scaling factor (denoted by a), a shift number (denoted by s) and an offset (denoted by b) is used in the motion compensation. Suppose the pixel value in position (x, y) of the reference picture is p(x, y), then $p'(x, y)=((a*p(x, y)+(1<<(s-1)))>>s)+b$ instead of p(x, y) is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

Figure 4A:
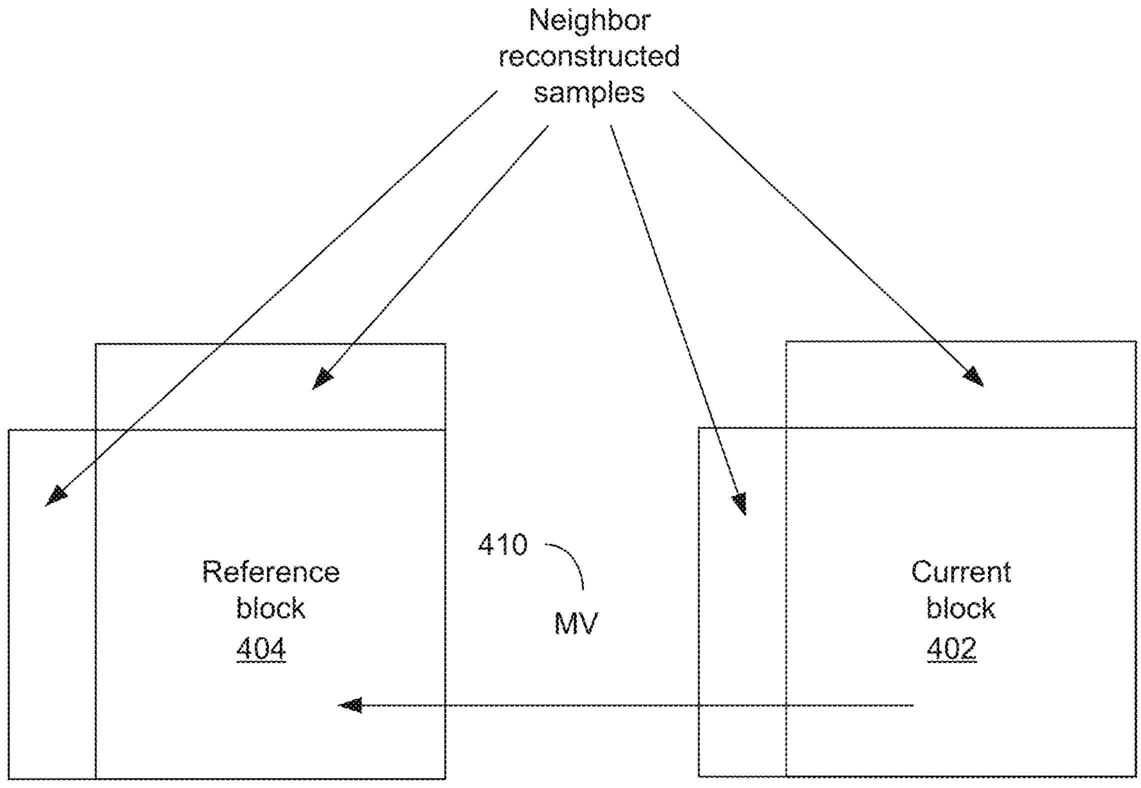
FIG. 4A is a conceptual diagram illustrating an example of neighboring samples of a current coding unit used for estimating motion compensation parameters for the current coding unit, in accordance with some examples of the disclosure.
Figure 4B:
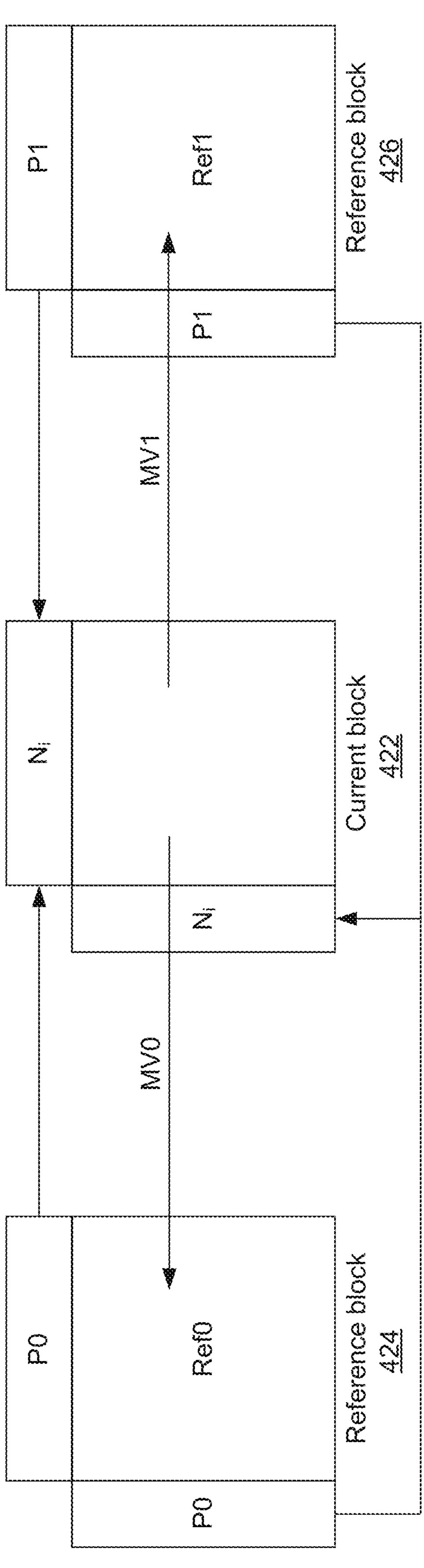
FIG. 4B is a conceptual diagram illustrating an example of neighboring samples of a reference block used for estimating motion compensation parameters for a current coding unit, in accordance with some examples of the disclosure.

FIG. 4A is a diagram illustrating an example of neighbor reconstructed samples of a current block 402 and neighbor samples of a reference block 404 used for uni-directional inter-prediction. A motion vector MV 410 can be coded for the current block 402, where the MV 410 can include a reference index to a reference picture list and/or other motion information for identifying the reference block 404. For example, the MV can include a horizontal and a vertical component that provides an offset from the coordinate position in the current picture to the coordinates in the reference picture identified by the reference index. FIG. 4B is a diagram illustrating an example of neighbor reconstructed samples of a current block 422 and neighbor samples of a first reference block 424 and a second reference block 426 used for bi-directional inter-prediction. In such a case, two motion vectors MV0 and MV1 can be coded for the current block 422 to identify the first reference block 424 and a second reference block 426, respectively.

As previously explained, OBMC is an example motion compensation technique that can be implemented for motion compensation. OBMC can increase prediction accuracy and avoid blocking artifacts. In OBMC, the prediction can be or include a weighted sum of multiple predictions. In some cases, blocks can be larger in each dimension and can overlap quadrant-wise with neighboring blocks. Thus, each pixel may belong to multiple blocks. For example, in some illustrative cases, each pixel may belong to 4 blocks. In such a scheme, OBMC may implement four predictions for each pixel which are summed up to a weighted mean.

In some cases, OBMC can be switched on and off using a particular syntax at the CU level. In some examples, there are two direction modes (e.g., top, left, right, bottom or below) in OBMC, including a CU-boundary OBMC mode and a subblock-boundary OBMC mode. When CU-boundary OBMC mode is used, the original prediction block using the current CU MV and another prediction block using a neighboring CU MV (e.g., an "OBMC block") are blended. In some examples, the top-left subblock in the CU (e.g., the first or left-most subblock on the first/top row of the CU) has top and left OBMC blocks, and the other top-most subblocks (e.g., other subblocks on the first/top row of the CU) may only have top OBMC blocks. Other left-most subblocks (e.g., subblocks on the first column of the CU on the left side of the CU) may only have a left OBMC block.

Subblock-boundary OBMC mode may be enabled when a sub-CU coding tool is enabled in the current CU (e.g., Affine motion compensated prediction, advanced temporal motion vector prediction (ATMVP), etc.) that allows for different MVs on a subblock basis. In subblock-boundary OBMC mode, separate OBMC blocks using MVs of connected neighboring subblocks can be blended with the original prediction block using the MV of the current subblock. In some examples, in subblock-boundary OBMC mode, separate OBMC blocks using MVs of connected neighboring subblocks can be blended in parallel with the original prediction block using the MV of the current subblock, as further described herein. In other examples, in subblock-boundary mode, separate OBMC blocks using MVs of connected neighboring subblocks can be blended sequentially with the original prediction block using the MV of the current subblock. In some cases, CU-boundary OBMC mode can be performed before subblock-boundary OBMC mode, and a predefined blending order for subblock-boundary OBMC mode may include top, left, bottom, and right.

Prediction based on the MV of a neighboring subblock N (e.g., subblocks above the current subblock, to the left of the current subblock, below the current subblock, and to the right of the current subblock), may be denoted as $P_N$ and prediction based on the MV of the current subblock may be denoted as $P_C$. When a subblock N contains the same motion information as the current subblock, the original prediction block may not be blended with the prediction block based on the MV of subblock N. In some cases, the samples of 4 rows/columns in $P_N$ may be blended with the same samples in $P_C$.

Figure 5:
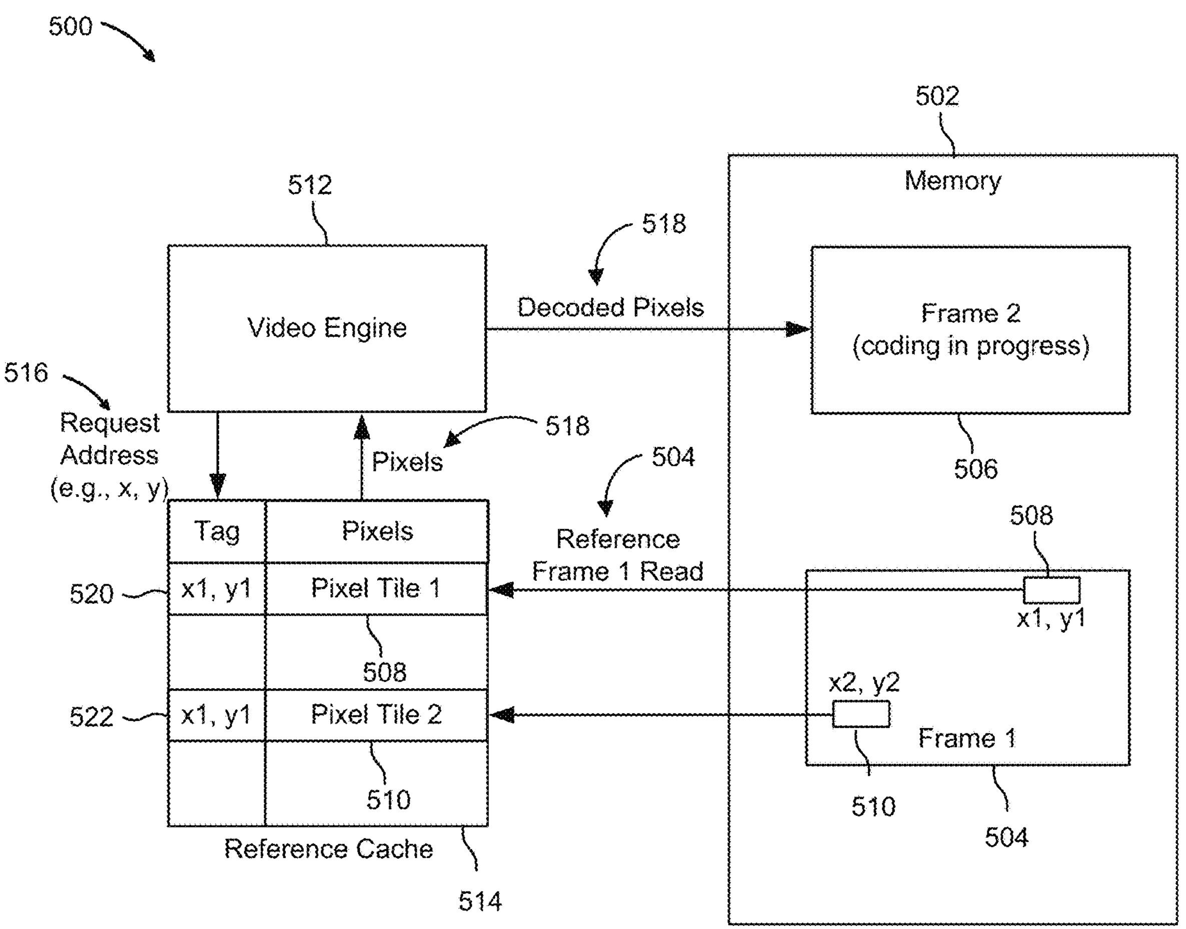
FIG. 5 is a diagram illustrating an example data flow for processing video data, in accordance with some examples of the disclosure.

FIG. 5 is a diagram illustrating an example data flow 500 for processing video data. In the example of FIG. 5, a video engine 512 can prefetch a previous frame 504 for use as a reference for a frame 506 (e.g., a new frame, a current frame) being decoded. In some examples, the previous frame 504 can include a previously-decoded frame associated with a same sequence of video frames as the frame 506. Moreover, the previous frame 504 and the frame 506 being decoded can be stored in memory 502 for access as needed. The memory 502 can include, for example, a random access memory (RAM) device that is external to a chip or processor of a hardware coder (e.g., encoding device 104 and/or decoding device 112).

In some examples, the video engine 512 can fetch pixels of the previous frame 504 in blocks of pixels referred to herein as pixel tiles. For example, the video engine 512 can fetch, from the memory 502, pixel tiles 508 and 510 of the previous frame 504. The video engine 512 can cache the pixel tiles 508 and 510 in a reference cache 514. The reference cache 514 can provide the hardware coder faster access to the pixel tiles 508 and 510 than the memory 502. In some examples, the reference cache 514 can include cache memory hosted locally on a chip or processor of the hardware coder. In other words, the reference cache 514 is considered on-chip memory of the hardware coder.

The video engine 512 can cache the pixel tiles 508 and 510 in the reference cache 514 along with tags 520 and 522 associated with the pixel tiles 508 and 510, respectively. The tags 520 and 522 can include an indication of the location of the pixel tiles 508 and 510 within the previous frame 504 that is used as a reference frame for coding the frame 506. For example, the tag 520 can include an indication of the location of the pixel tile 508 within the previous frame 504, and the tag 522 can include an indication of the location of the pixel tile 510 within the previous frame 504.

In some cases, the tags 520 and 522 can include the addresses of the pixel tiles 508 and 510, respectively, within the previous frame 504. For example, the tag 520 can include an indication of the coordinates of the pixel tile 508 within the previous frame 504, and the tag 522 can include an indication of the coordinates of the pixel tile 510 within the previous frame 504.

When the video engine 512 needs the pixel tiles 508 and 510 as reference pixels to code the frame 506, the video engine 512 can send to the reference cache 514 a respective request 516 for the pixel tile 508 and the pixel tile 510. The respective request 516 can include an indication of the location (e.g., the address) of the pixel tile being requested. For example, the request for the pixel tile 508 can include the address (e.g., the coordinates) of the pixel tile 508 within the previous frame 504, and the request for the pixel tile 510 can include the address (e.g., coordinates) of the pixel tile 510 within the previous frame 504. When the reference cache 514 receives a request (e.g., request 516) for a pixel tile in the reference cache 514 (e.g., pixel tile 508 or pixel tile 510), the video engine 512 and/or a processor associated with the reference cache 514 can compare the location information in the request with the location information in the tags (e.g., tag 520 and tag 522) in the reference cache 514. If the request results in a cache hit (e.g., a match between the location information in the request and the location information in a tag), the video engine 512 can retrieve, from the reference cache, the pixel tile associated with the location information that caused the cache hit.

Once the video engine 512 retrieves, from the reference cache 514, the pixels 518 of a pixel tile (e.g., pixel tile 508 or pixel tile 510) that the video engine 512 will use as reference pixels for decoding the frame 506, the video engine 512 can use the decoded pixels 518 of the pixel tile to code the frame 506. For example, the video engine 512 can retrieve the pixels of the pixel tile 508 from the reference cache 514 and use the pixels of the pixel tile 508 to predict pixels of the frame 506 being coded. Similarly, the video engine 512 can retrieve the pixels of the pixel tile 510 from the reference cache 514 and use the pixels of the pixel tile 510 to predict pixels of the frame 506 being coded.

Figure 6A:
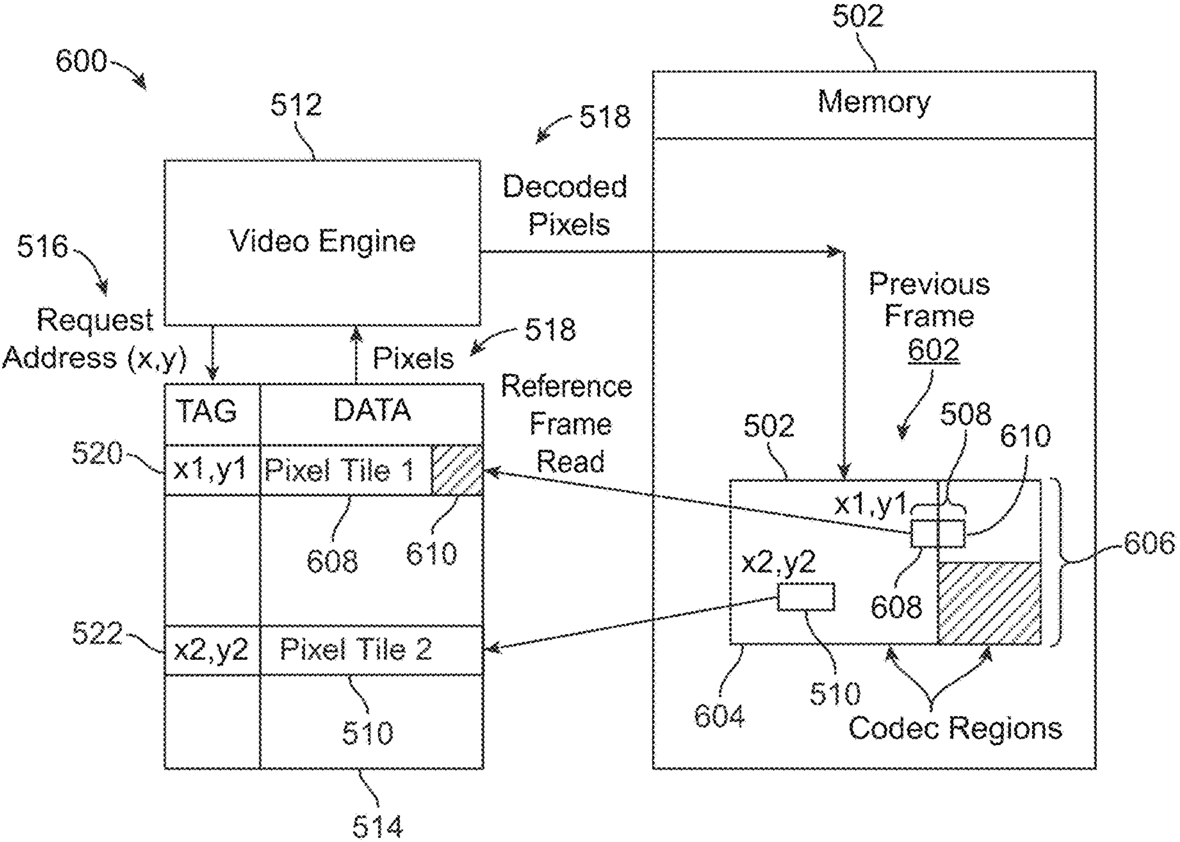
FIG. 6A, FIG. 6B, and FIG. 6C are diagrams illustrating example data flows for processing video data, in accordance with some examples of the disclosure.

FIG. 6A is a diagram illustrating an example data flow 600 for processing a frame 602 of video data (e.g., based on performing intra-block copy). For example, based on performing intra-block copy, the frame 602 that is being decoded is also used as a reference frame (e.g., blocks of the frame 602 can be used as reference blocks when coding other blocks of the frame). In some cases, the frame 602 is decoded one codec region at a time. For example, the video engine 512 can first decode codec region 604 of the frame 602 and subsequently decode codec region 606 of the frame 602.

As illustrated, pixel tile 510 is entirely within the codec region 604. However, pixel tile 508 spans codec region 604 and codec region 606. In particular, partial pixel tile 608 including a portion of the pixel tile 508 is within the codec region 604 and partial pixel tile 610 including a portion of the pixel tile 508 is within the codec region 606. Thus, when the codec region 604 is decoded (before decoding the codec region 606), the pixel tile 508 will be partially filled, and the partial pixel tile 610 of the pixel tile 508 will be missing and/or stale.

In the example of FIG. 6A, when the codec region 604 is being decoded by the video engine 512, the video engine 512 may fetch the partial pixel tile 608 and cache the partial pixel tile 608 in the reference cache 514. When the codec region 606 is being decoded by the video engine 512, the video engine 512 can request pixels from the partial pixel tile 610 of the pixel tile 508 using the location information of the pixel tile 508. Since the partial pixel tile 610 has not yet been decoded and stored in the reference cache 514, when the video engine 512 requests the pixels from the partial pixel tile 610 using the address of the pixel tile 508, the request will not find the pixels associated with the partial pixel tile 610 in the reference cache 514 and the request will thus complete with stale, invalid, and/or incomplete data corresponding to the partial pixel tile 610.

Figure 6B:
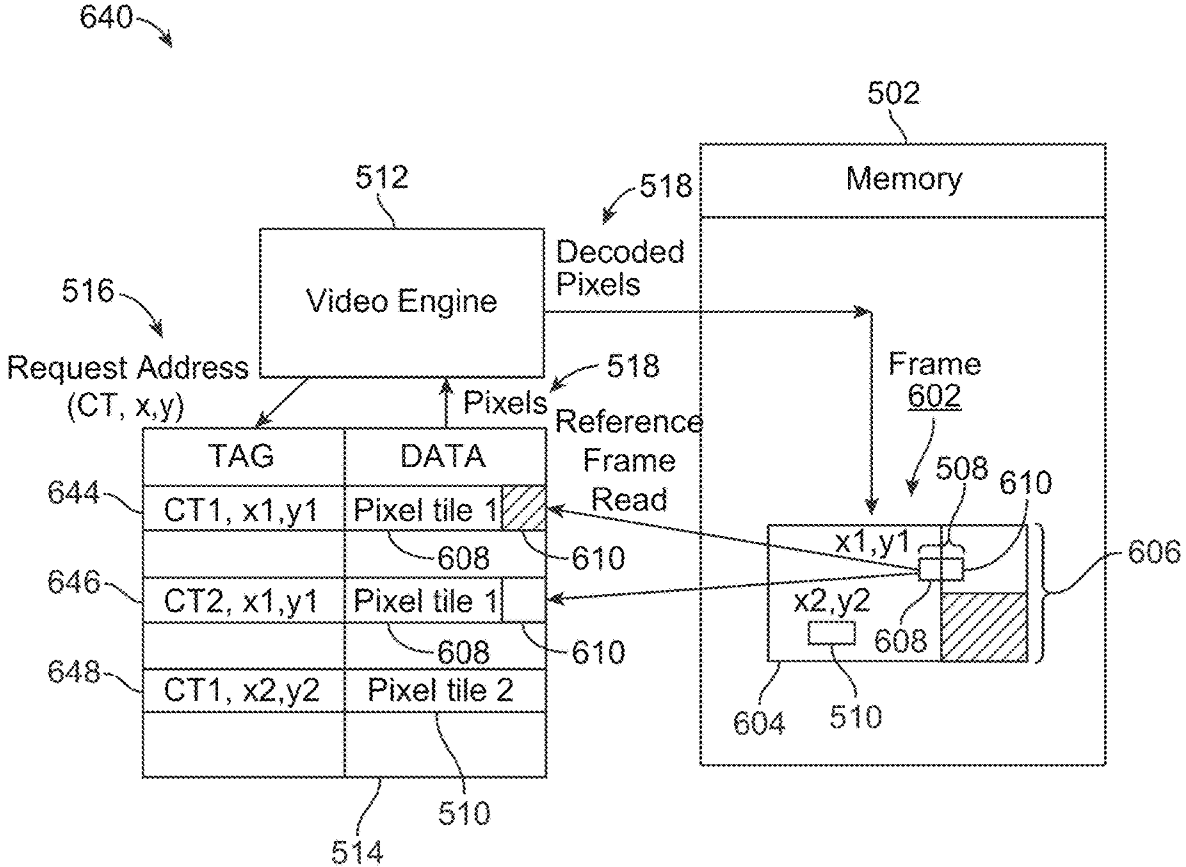

FIG. 6B is a diagram illustrating another example data flow 640 for processing a frame 602 of video data (e.g., based on performing intra-block copy). In the example of FIG. 6B, each codec region (e.g., codec region 604 and codec region 606) is assigned a number. In some examples, each codec region is assigned a number sequentially in a raster scan order. The codec region number associated with a partial pixel tile (e.g., partial pixel tile 608 and partial pixel tile 610) can be included in the tag (e.g., tag 644, 646, or 648) of that pixel tile along with the location information (e.g., address) of that pixel tile within the frame 602.

For example, tag 644 corresponding to the partial pixel tile 608 can include codec region information that identifies the codec region number of codec region 604 that was being coded when the pixel tile was stored in the reference cache 514 (and/or the codec region where the partial pixel tile 608 resides), as well as the location of the pixel tile 508 that includes the partial pixel tile 608. Similarly, tag 646 corresponding to the partial pixel tile 610 can include codec region information identifying the codec region number of codec region 606 that was being coded when the pixel tile was stored in the reference cache 514 (and/or the codec region where the partial pixel tile 610 resides), as well as the location of the pixel tile 508 that includes the partial pixel tile 610. Thus, when the video engine 512 needs to retrieve the partial pixel tile 608 from the reference cache 514, the video engine 512 can use the tag 644 to locate and retrieve the partial pixel tile 608. When the video engine 512 needs to retrieve the partial pixel tile 610 from the reference cache 514, the video engine 512 can use the tag 646 to locate and retrieve the partial pixel tile 610. Accordingly, the tags 644 and 646 can allow the video engine 512 to retrieve any partial pixel tile that the video engine 512 needs regardless of which codec region is currently being or has been decoded, avoiding retrieving of stale, invalid, and/or incomplete pixel tile data as previously explained with respect to FIG. 6A.

The tag 648 associated with the pixel tile 510 can include codec region information that identifies the codec region number of the codec region 604 that was being coded when the pixel tile was stored in the reference cache 514 (and/or the codec region where the pixel tile 510 resides), as well as the location of the pixel tile 510 within the frame 602. Thus, the video engine 512 can similarly use the tag 648 associated with the pixel tile 510 to locate and retrieve the pixel tile 510 from the reference cache 514.

When the video engine 512 uses a tag (e.g., tag 644, tag 646, or tag 648) to locate and retrieve pixel tile data from the reference cache 514, the codec region number and pixel tile location information in the tag (e.g., tag 644, tag 644, or tag 648) can be used to locate and retrieve an entire pixel tile or a partial pixel tile. For example, if a pixel tile resides entirely within a codec region 604, such as pixel tile 510, the tag (e.g., tag 648) associated with that pixel tile can be used to locate and retrieve the entire pixel tile from the reference cache 514, as the tag identifies the codec region (e.g., codec region 604) in which the pixel tile resides as well as the address of the pixel tile within the frame 602.

If, on the other hand, a pixel tile includes a portion that resides in one codec region (e.g., partial pixel tile 608) and another portion that resides in another codec region (e.g., partial pixel tile 610), the tag (e.g., tag 644 or tag 646) associated with a portion of the pixel tile (e.g., partial pixel tile 608 or partial pixel tile 610) being retrieved by the video engine 512 can be used to locate and retrieve that particular portion of the pixel tile in its entirety (e.g., without stale, invalid, and/or incomplete data), as the tag includes codec region information identifying the codec region (e.g., codec region 604 or codec region 606) corresponding to the codec region that was being coded when the pixel tile was stored in the reference cache 514 (and/or the codec region in which that portion of the pixel tile resides). The tag may also include the address of the pixel tile within the frame 602. Thus, when needed, the tag 644 can be used to locate and retrieve the partial pixel tile 608 from the reference cache 514 in its entirety and, when needed, the tag 646 can be used to locate and retrieve the partial pixel tile 610 from the reference cache 514 in its entirety.

In some examples, when using a tag to retrieve a pixel tile or a partial pixel tile, the access request (e.g., request 516) to the reference cache 514 from the video engine 512 can yield a cache hit when both the codec region number and pixel tile location information in the access request match the codec region number and pixel tile location information in a tag on the reference cache 514. If the access request yields a hit, the requested pixels (e.g., the requested pixel tile or partial pixel tile) can be read from the reference cache 514, which is faster than reading the requested pixels from the memory 502. If the access request does not yield a hit, the requested pixels (e.g., the requested pixel tile or partial pixel tile) can be read from the memory 502 as the failure to yield a hit indicates that the requested pixels are not available in the reference cache 514. The data flow 640 shown in FIG. 6B and the use of codec region numbers in tags (e.g., in tags 644 through 648) can ensure that partial pixel tiles can be cached in the reference cache 514 and refreshed each time a new codec region is decoded.

In some cases, the video engine 512 may decode frames on a per-slice basis. For example, when implementing certain video coding standards and/or schemes, the video engine 512 may decode each frame on a per-slice basis rather than a per-codec region basis.

Figure 6C:
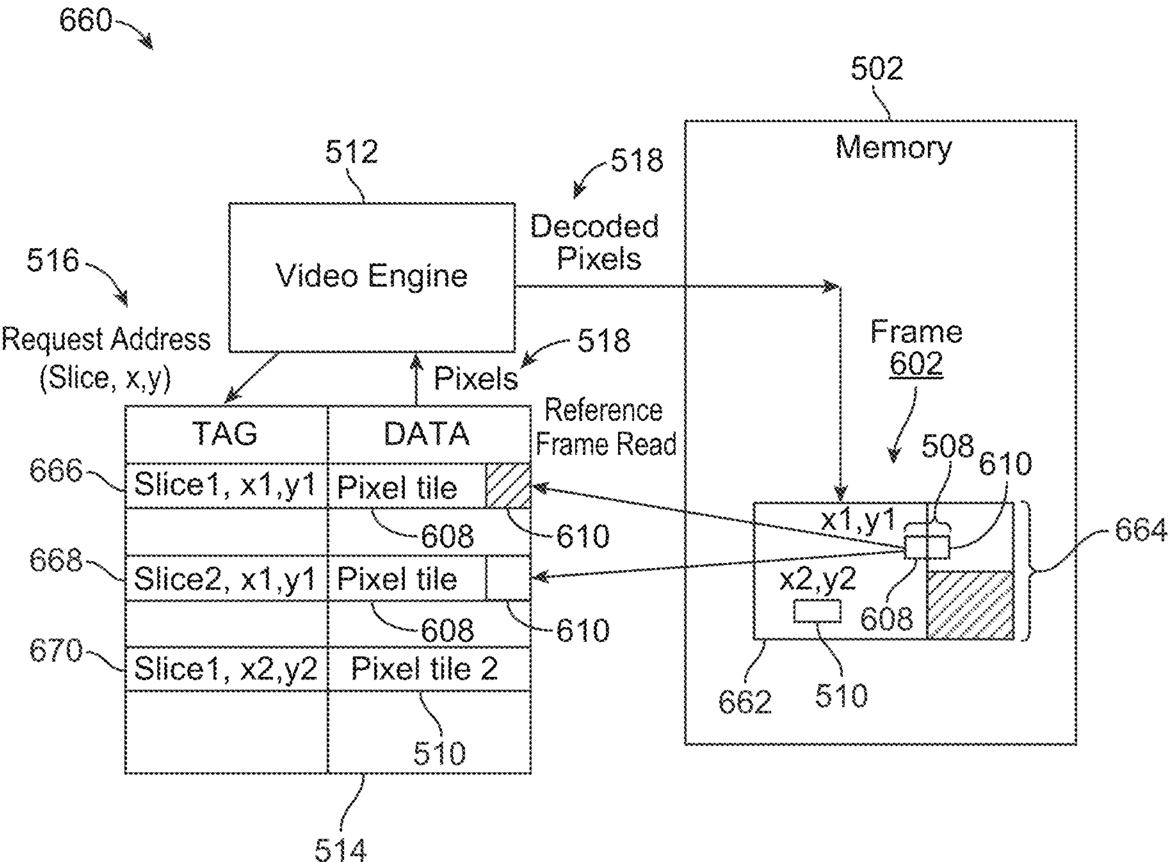

FIG. 6C is a diagram illustrating another example data flow 660 for processing a frame 602 of video data (e.g., based on performing intra-block copy). In the example of FIG. 6C, the video engine 512 decodes the frame 602 on a per-slice basis. For example, the frame 602 includes slice 662 and slice 664, and the video engine 512 decodes the slice 662 of the frame 602 first and the slice 664 of the frame 602 next. To create the tags 666, 668, 670 associated with the pixel tile 510, the partial pixel tile 608, and the partial pixel tile 610, respectively, the video engine 512 can assign a number to each slice (e.g., slice 662 and slice 664). In some examples, each slice is assigned a number sequentially in a raster scan order.

The slice number associated with a partial pixel tile (e.g., partial pixel tile 608 and partial pixel tile 610) can be included in the tag (e.g., tag 666, 668, or 670) of that pixel tile along with the location information (e.g., address) of that pixel tile within the frame 602. For example, tag 666 corresponding to the partial pixel tile 608 can include the slice number of slice 662 that was being coded when the pixel tile was stored in the reference cache 514 (and/or the codec region where the partial pixel tile 608 resides), as well as the location of the pixel tile 508 that includes the partial pixel tile 608. Similarly, tag 668 corresponding to the partial pixel tile 610 can include the slice number of slice 664 that was being coded when the pixel tile was stored in the reference cache 514 (and/or the codec region where the partial pixel tile 610 resides), as well as the location of the pixel tile 508 that includes the partial pixel tile 610. Thus, when the video engine 512 needs to retrieve the partial pixel tile 608 from the reference cache 514, the video engine 512 can use the tag 666 to locate and retrieve the partial pixel tile 608. When the video engine 512 needs to retrieve the partial pixel tile 610 from the reference cache 514, the video engine 512 can use the tag 668 to locate and retrieve the partial pixel tile 610. Accordingly, the tags 666 and 668 can allow the video engine 512 to retrieve any partial pixel tile that the video engine 512 needs regardless of what slice is currently being (or has been) decoded, which can prevent the video engine 512 from retrieving stale, invalid, and/or incomplete pixel tile data as previously explained with respect to FIG. 6A.

The tag 670 associated with the pixel tile 510 can include the slice number of the slice 662 that was being coded when the pixel tile was stored in the reference cache 514 (and/or the codec region where the pixel tile 510 resides), as well as the location of the pixel tile 510 within the frame 602. Thus, the video engine 512 can similarly use the tag 670 associated with the pixel tile 510 to locate and retrieve the pixel tile 510 from the reference cache 514.

When the video engine 512 uses a tag (e.g., tag 666, tag 668, or tag 670) to locate and retrieve pixel tile data from the reference cache 514, the slice number and pixel tile location information in the tag (e.g., tag 666, tag 666, or tag 670) can be used to locate and retrieve an entire pixel tile or a partial pixel tile. For example, if a pixel tile resides entirely within a slice 662, such as pixel tile 510, the tag (e.g., tag 670) associated with that pixel tile can be used to locate and retrieve the entire pixel tile from the reference cache 514, as the tag identifies the slice (e.g., slice 662) in which the pixel tile resides as well as the address of the pixel tile within the frame 602.

If, on the other hand, a pixel tile includes a portion that resides in one slice (e.g., partial pixel tile 608) and another portion that resides in another slice (e.g., partial pixel tile 610), the tag (e.g., tag 666 or tag 668) associated with a portion of the pixel tile (e.g., partial pixel tile 608 or partial pixel tile 610) being retrieved by the video engine 512 can be used to locate and retrieve that particular portion of the pixel tile in its entirety (e.g., without stale, invalid, and/or incomplete data), as the tag identifies the slice (e.g., slice 662 or slice 664) in which that portion of the pixel tile resides as well as the address of the pixel tile within the frame 602. Thus, when needed, the video engine 512 can use the tag 666 to locate and retrieve the partial pixel tile 608 from the reference cache 514 in its entirety and, when needed, the video engine 512 can use the tag 668 to locate and retrieve the partial pixel tile 610 from the reference cache 514 in its entirety.

In some examples, when using a tag to retrieve a pixel tile or a partial pixel tile, the access request (e.g., request 516) to the reference cache 514 from the video engine 512 can yield a cache hit when both the slice number and pixel tile location information in the access request match the slice number and pixel tile location information in a tag on the reference cache 514. If the access request yields a hit, the requested pixels (e.g., the requested pixel tile or partial pixel tile) can be read from the reference cache 514, which is faster than reading the requested pixels from the memory 502. If the access request does not yield a hit, the requested pixels (e.g., the requested pixel tile or partial pixel tile) can be read from the memory 502 as the failure to yield a hit indicates that the requested pixels are not available in the reference cache 514. The data flow 660 shown in FIG. 6C and the use of slice numbers in tags (e.g., in tags 666 through 670) can ensure that partial pixel tiles can be cached in the reference cache 514 and refreshed each time a new slice is decoded.

FIG. 7 is a flowchart illustrating an example process 700 for encoding or decoding (coding) video data according to aspects described herein (e.g., based on caching misaligned pixel tiles). At block 702, the process can include determining a first codec region (e.g., codec region 604, codec region 606, slice 662, or slice 664) associated with a first block to be coded. The first codec region can include one among a plurality of regions of a frame (e.g., frame 602). In some examples, each region among the plurality of regions of the frame is independently codable (e.g., coded independently from one another).

At block 704, the process 700 can include determining whether reference pixels of a first version of a pixel tile (e.g., pixel tile 508, pixel tile 510, partial pixel tile 608, or partial pixel tile 610) were stored in a cache (e.g., reference cache 514) while coding one or more blocks from a second codec region (e.g., codec region 604, codec region 606, slice 662, or slice 664). In some examples, the cache can be hosted locally on a chip (e.g., a processor, a processing circuit, etc.) of a hardware coder (e.g., encoding device 104 and/or decoding device 112). In some cases, the pixel tile corresponds to a location within the frame (e.g., frame 602). In some cases, the first codec region can include one of a first codec region or a first slice, and the second codec region can include one of a second codec region or a second slice.

In some examples, determining whether the reference pixels of the first version of the pixel tile were stored in the cache while coding the one or more blocks from the second codec region can include determining that the first version of the pixel tile is associated with the first codec region or the second codec region. In some cases, the hardware coder (e.g., encoding device 104 and/or decoding device 112) or a video engine (e.g., video engine 512) of the hardware coder can determine whether the reference pixels of the first version of the pixel tile were stored in the cache while coding the one or more blocks from the second codec region based on a tag (e.g., tag 644, tag 646, tag 648, tag 666, tag 668, or tag 670). In some examples, the tag can include a first indication of the location of the pixel tile within the frame and a second indication that associates the first version of the pixel tile with one of the first codec region or the second codec region.

At block 706, the process 700 can include based on determining whether the reference pixels of the first version of the pixel tile were stored in the cache while coding the one or more blocks from the second codec region, determining whether to read the first version of the pixel tile from the cache or retrieve a second version of the pixel tile (e.g., pixel tile 508, pixel tile 510, partial pixel tile 608, or partial pixel tile 610) from a memory device (e.g., memory 502) that is external to the chip of the hardware coder. In some examples, the second version of the pixel tile can include reference pixels from the first codec region that are not in the first version of the pixel tile.

In some examples, the memory device can include a random access memory (RAM) device such as, for example, double data rate (DDR) synchronous dynamic random-access memory (SDRAM) or any other type of memory device. Moreover, the RAM device can be a separate memory from the cache.

At block 708, the process 700 can include coding the first block associated with the first codec region based at least partly on the first version of the pixel tile read from the cache or the second version of the pixel tile retrieved from the memory device.

In some aspects, the process 700 can include determining that the reference pixels of the first version of the pixel tile were stored in the cache while coding the one or more blocks from the second codec region, and based on a determination that the reference pixels of the first version of the pixel tile were stored in the cache while coding the one or more blocks from the second codec region, determining to retrieve the second version of the pixel tile from the memory device.

In some aspects, the process 700 can include determining that the reference pixels of the first version of the pixel tile were not stored in the cache while coding the one or more blocks from the second codec region, and based on a determination that the reference pixels of the first version of the pixel tile were not stored in the cache while coding the one or more blocks from the second codec region, determining to read the first version of the pixel tile from the cache.

In some aspects, the process 700 can include determining the location of the pixel tile within the frame. The process 700 can include determining that the first version of the pixel tile resides within one of the first codec region or the second codec region. The process 700 can further include generating a tag including a first indication of the location of the pixel tile within the frame and data indicating that the first version of the pixel tile resides within the one of the first codec region or the second codec region. The process 700 can include storing the tag in the cache and in association with the first version of the pixel tile.

In some aspects, the process 700 can include generating a request (e.g., request 516) to access the reference pixels of the first version of the pixel tile from the cache. The process 700 can include determining that both of the respective location of the pixel tile identified in the request and the respective codec region identified in the request match the location of the pixel tile identified in the tag associated with the first version of the pixel tile and the one of the first codec region or the second codec region identified in the tag. The process 700 can further include determining, based on the match, that the reference pixels of the first version of the pixel tile were stored in the cache while coding the one or more blocks from the second codec region. In some examples, the request can identify a respective location of the pixel tile within the frame and a respective codec region that was being coded when the first version of the pixel tile was stored in the cache (and/or the codec region where the first version of the pixel tile resides).

In some aspects, the process 700 can include generating a request to access the reference pixels of the first version of the pixel tile from the cache. In some examples, the request identifies a respective location of the pixel tile within the frame and a respective codec region that was being coded when the first version of the pixel tile was stored in the cache (and/or the codec region where the first version of the pixel tile resides). In some aspects, the process 700 can further include determining that the respective location of the pixel tile identified in the request and/or the respective codec region identified in the request does not match the location of the pixel tile identified in the tag associated with the first version of the pixel tile and the one of the first codec region or the second codec region identified in the tag, and based on a determination that at least one of the respective location of the pixel tile identified in the request and the respective codec region identified in the request does not match the location of the pixel tile identified in the tag associated with the first version of the pixel tile and the one of the first codec region or the second codec region identified in the tag, determining that the reference pixels of the first version of the pixel tile were not stored in the cache while coding the one or more blocks from the second codec region.

In some aspects, the process 700 can include determining that the first version of the pixel tile resides within the first codec region and the second version of the pixel tile resides within the second codec region, and based on a determination that the first version of the pixel tile resides within the first codec region and the second version of the pixel tile resides within the second codec region, disabling use of the cache to store or access the first version of the pixel tile and the second version of the pixel tile.

In some cases, the process 700 can be implemented by an encoder and/or a decoder.

In some implementations, the processes (or methods) described herein (including process 700) can be performed by a computing device or an apparatus, such as the system 100 shown in FIG. 1. For example, the processes can be performed by the encoding device 104 shown in FIG. 1 and FIG. 8, by another video source-side device or video transmission device, by the decoding device 112 shown in FIG. 1 and FIG. 9, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of process 700.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called “smart” phones, so-called “smart” pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. The data connection may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a “CODEC.” Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various aspects of the application have been described.

Figure 8:
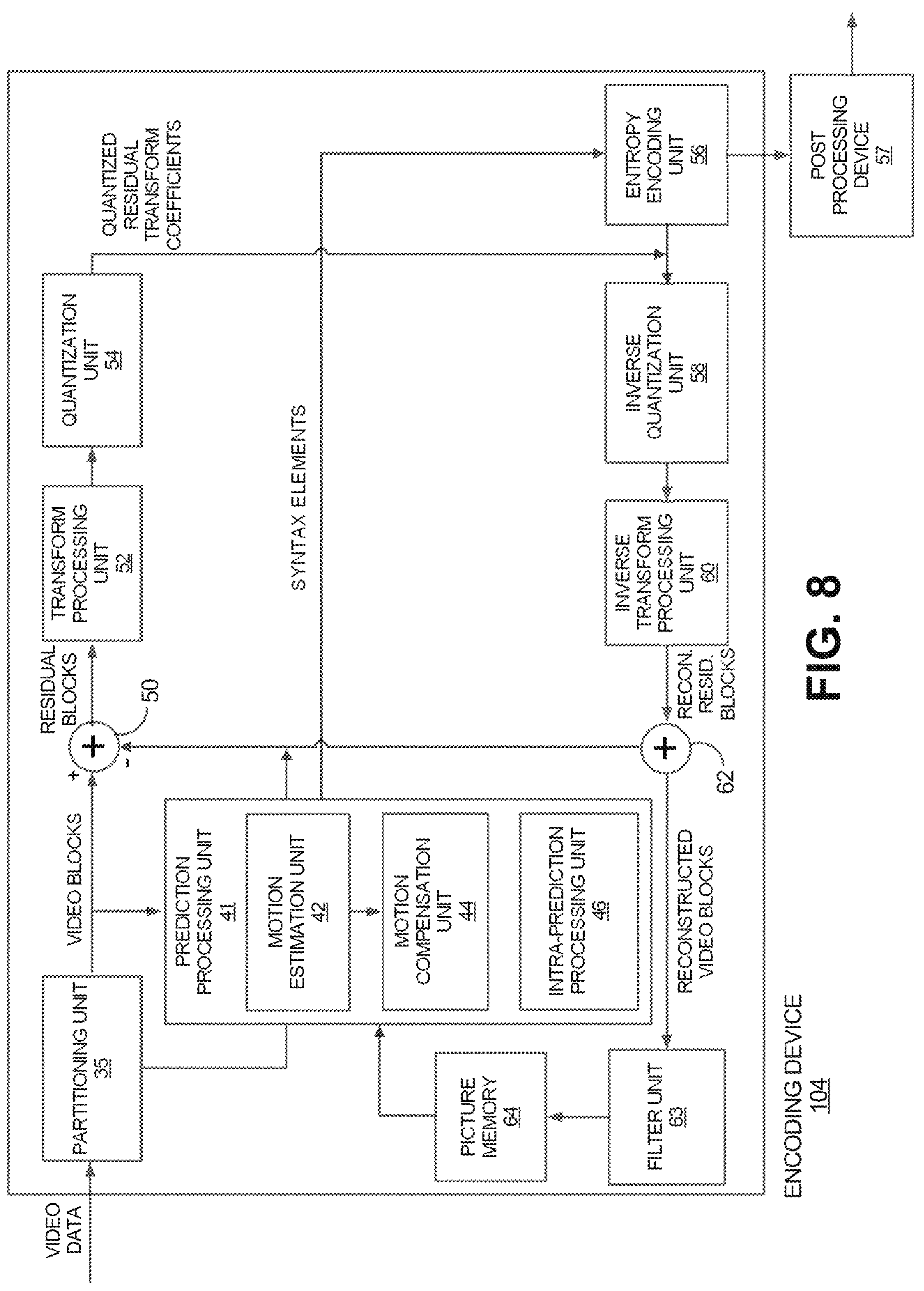
FIG. 8 is a block diagram illustrating an example video encoding device, in accordance with some examples of the disclosure.
Figure 9:
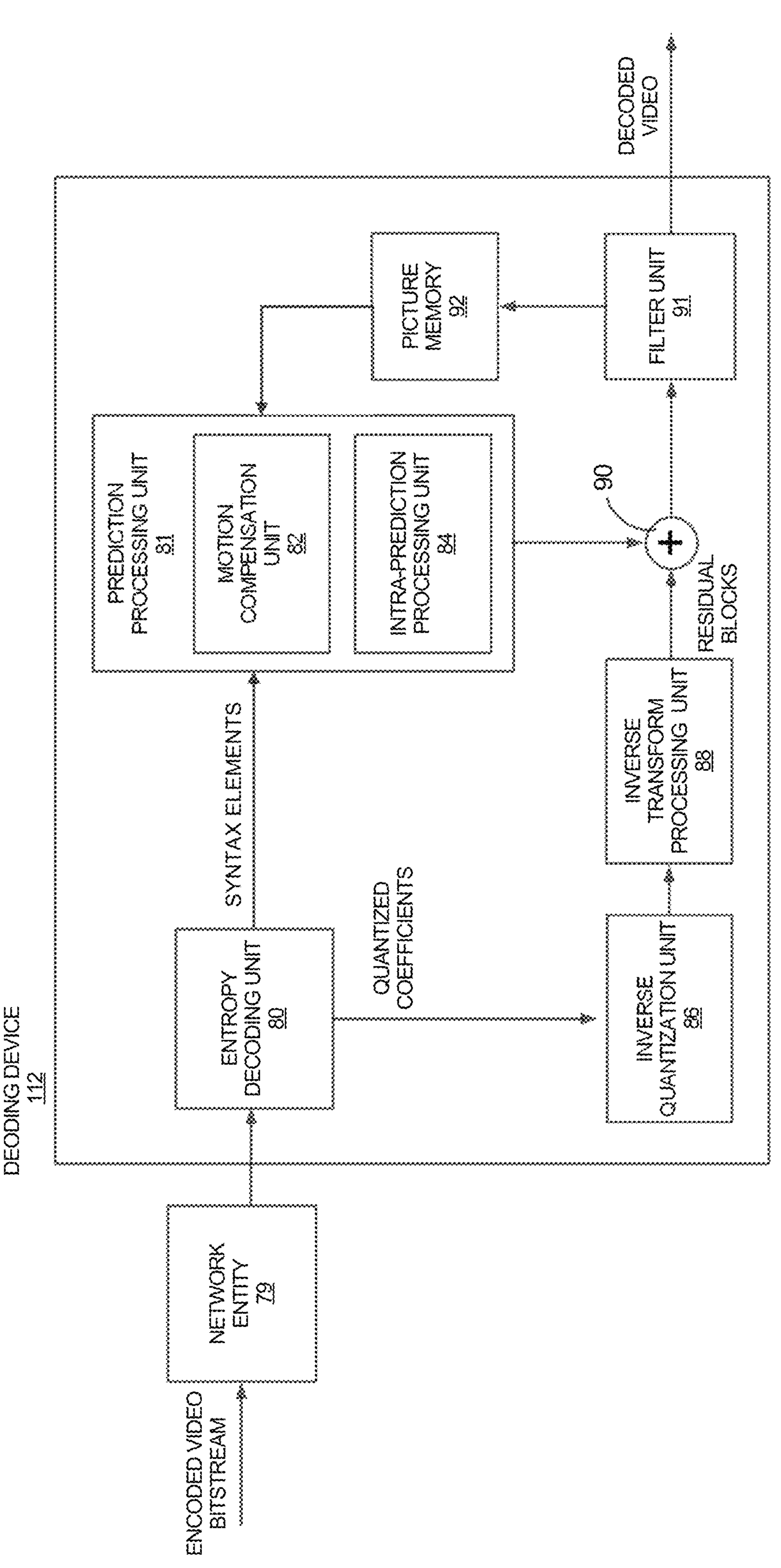
FIG. 9 is a block diagram illustrating an example video decoding device, in accordance with some examples of the disclosure.

Specific details of the encoding device 104 and the decoding device 112 are shown in FIGS. 8 and 9, respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 8, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform the subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 8 represents an example of a video encoder configured to perform any of the techniques described herein, including the process described above with respect to FIG. 7. In some cases, some of the techniques of this disclosure may also be implemented by post processing device 57.

FIG. 9 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 8.

During the decoding process, the decoding device 112 receives an encoded video bitstream that represents video blocks of an encoded video slice and associated syntax elements sent by the encoding device 104. In some aspects, the decoding device 112 may receive the encoded video bitstream from the encoding device 104. In some aspects, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform the summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 9 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 9 represents an example of a video decoder configured to perform any of the techniques described herein, including the process described above with respect to FIG. 7.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the various aspects of the disclosure in unnecessary detail. In other instances, well-known circuits, processes, algorithms, structures, and techniques may be shown without unnecessary detail in order to avoid obscuring the various aspects of the disclosure.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects of the disclosure can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than (“<”) and greater than (“>”) symbols or terminology used herein can be replaced with less than or equal to (“≤”) and greater than or equal to (“≥”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting “at least one of” a set and/or “one or more” of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative Aspects of the disclosure include:

Aspect 1. An apparatus for encoding or decoding (coding) video data, comprising: a memory; and one or more processors coupled to the memory, the one or more processors configured to: determine a first codec region associated with a first block to be coded, the first codec region being one of a plurality of codec regions of a frame, wherein each codec region among the plurality of codec regions of the frame is independently codable; determine whether reference pixels of a first version of a pixel tile were stored in a cache while coding one or more blocks from a second codec region, wherein the cache is hosted locally on a chip of a hardware coder, and wherein the pixel tile corresponds to a location within the frame; based on determining whether the reference pixels of the first version of the pixel tile were stored in the cache while coding the one or more blocks from the second codec region, determine whether to read the first version of the pixel tile from the cache or retrieve a second version of the pixel tile from a memory device that is external to the chip of the hardware coder, wherein the second version of the pixel tile comprises reference pixels from the first codec region that are not in the first version of the pixel tile; and code the first block associated with the first codec region based at least partly on the first version of the pixel tile read from the cache or the second version of the pixel tile retrieved from the memory device.

Aspect 2. The apparatus of Aspect 1, wherein, to determine whether the reference pixels of the first version of the pixel tile were stored in the cache while coding the one or more blocks from the second codec region, the one or more processors are configured to determine whether the first version of the pixel tile is associated with the first codec region or the second codec region.

Aspect 3. The apparatus of any of Aspects 1 to 2, wherein the one or more processors are configured to determine whether the reference pixels of the first version of the pixel tile were stored in the cache while coding the one or more blocks from the second codec region based on a tag.

Aspect 4. The apparatus of Aspect 3, wherein the tag comprises a first indication of the location of the pixel tile within the frame and a second indication that associates the first version of the pixel tile with one of the first codec region or the second codec region.

Aspect 5. The apparatus of any of Aspects 1 to 4, wherein the first codec region comprises one of a first codec tile or a first slice, and wherein the second codec region comprises one of a second codec tile or a second slice.

Aspect 6. The apparatus of any of Aspects 1 to 5, wherein the one or more processors are configured to: determine that the reference pixels of the first version of the pixel tile were stored in the cache while coding the one or more blocks from the second codec region; and based on a determination that the reference pixels of the first version of the pixel tile were stored in the cache while coding the one or more blocks from the second codec region, determine to retrieve the second version of the pixel tile from the memory device.

Aspect 7. The apparatus of Aspect 6, wherein the one or more processors are configured to: determine that the reference pixels of the first version of the pixel tile were not stored in the cache while coding the one or more blocks from the second codec region; and based on a determination that the reference pixels of the first version of the pixel tile were not stored in the cache while coding the one or more blocks from the second codec region, determine to read the first version of the pixel tile from the cache.

Aspect 8. The apparatus of any of Aspects 1 to 7, wherein the one or more processors are configured to: determine the location of the pixel tile within the frame; determine that the first version of the pixel tile resides within one of the first codec region or the second codec region; generate a tag comprising a first indication of the location of the pixel tile within the frame and data indicating that the first version of the pixel tile resides within the one of the first codec region or the second codec region; and store the tag in the cache and in association with the first version of the pixel tile.

Aspect 9. The apparatus of Aspect 8, wherein the one or more processors are configured to: generate a request to access the reference pixels of the first version of the pixel tile from the cache, wherein the request identifies a respective location of the pixel tile within the frame and a respective codec region coded when the first version of the pixel tile was stored in the cache; determine that both of the respective location of the pixel tile identified in the request and the respective codec region identified in the request match the location of the pixel tile identified in the tag associated with the first version of the pixel tile and the one of the first codec region or the second codec region identified in the tag; and based on the match, determine that the reference pixels of the first version of the pixel tile were stored in the cache while coding the one or more blocks from the second codec region.

Aspect 10. The apparatus of Aspect 8, wherein the one or more processors are configured to: generate a request to access the reference pixels of the first version of the pixel tile from the cache, wherein the request identifies a respective location of the pixel tile within the frame and a respective codec region coded when the first version of the pixel tile was stored in the cache; determine that at least one of the respective location of the pixel tile identified in the request and the respective codec region identified in the request does not match the location of the pixel tile identified in the tag associated with the first version of the pixel tile and the one of the first codec region or the second codec region identified in the tag; and based on a determination that at least one of the respective location of the pixel tile identified in the request and the respective codec region identified in the request does not match the location of the pixel tile identified in the tag associated with the first version of the pixel tile and the one of the first codec region or the second codec region identified in the tag, determine that the reference pixels of the first version of the pixel tile were not stored in the cache while coding the one or more blocks from the second codec region.

Aspect 11. The apparatus of any of Aspects 1 to 10, wherein the one or more processors are configured to: determine that the first version of the pixel tile resides within the first codec region and the second version of the pixel tile resides within the second codec region; and based on a determination that the first version of the pixel tile resides within the first codec region and the second version of the pixel tile resides within the second codec region, disable use of the cache to store or access the first version of the pixel tile and the second version of the pixel tile.

Aspect 12. The apparatus of any of Aspects 1 to 11, wherein the memory device comprises a random access memory (RAM) device, and wherein the RAM device is a separate memory from the cache.

Aspect 13. The apparatus of any of Aspects 1 to 12, wherein the apparatus includes a decoder.

Aspect 14. The apparatus of any of Aspects 1 to 13, further comprising a display configured to display one or more output pictures associated with the video data.

Aspect 15. The apparatus of any of Aspects 1 to 14, wherein the apparatus includes an encoder.

Aspect 16. The apparatus of any of Aspects 1 to 15, further comprising a camera configured to capture pictures associated with the video data.

Aspect 17. The apparatus of any of Aspects 1 to 16, wherein the apparatus is a mobile device.

Aspect 18. A method of encoding or decoding (coding) video data, comprising: determining a first codec region associated with a first block to be coded, the first codec region being one of a plurality of codec regions of a frame, wherein each codec region among the plurality of codec regions of the frame is independently codable; determining whether reference pixels of a first version of a pixel tile were stored in a cache while coding one or more blocks from a second codec region, wherein the cache is hosted locally on a chip of a hardware coder, and wherein the pixel tile corresponds to a location within the frame; based on determining whether the reference pixels of the first version of the pixel tile were stored in the cache while coding the one or more blocks from the second codec region, determining whether to read the first version of the pixel tile from the cache or retrieve a second version of the pixel tile from a memory device that is external to the chip of the hardware coder, wherein the second version of the pixel tile comprises reference pixels from the first codec region that are not in the first version of the pixel tile; and coding the first block associated with the first codec region based at least partly on the first version of the pixel tile read from the cache or the second version of the pixel tile retrieved from the memory device.

Aspect 19. The method of Aspect 18, wherein determining whether the reference pixels of the first version of the pixel tile were stored in the cache while coding the one or more blocks from the second codec region comprises determining whether the first version of the pixel tile is associated with the first codec region or the second codec region.

Aspect 20. The method of any of Aspects 18 to 19, further comprising determining whether the reference pixels of the first version of the pixel tile were stored in the cache while coding the one or more blocks from the second codec region based on a tag.

Aspect 21. The method of Aspect 20, wherein the tag comprises a first indication of the location of the pixel tile within the frame and a second indication that associates the first version of the pixel tile with one of the first codec region or the second codec region.

Aspect 22. The method of any of Aspects 18 to 21, wherein the first codec region comprises one of a first codec tile or a first slice, and wherein the second codec region comprises one of a second codec tile or a second slice.

Aspect 23. The method of any of Aspects 18 to 22, further comprising: determining that the reference pixels of the first version of the pixel tile were stored in the cache while coding the one or more blocks from the second codec region; and based on a determination that the reference pixels of the first version of the pixel tile were stored in the cache while coding the one or more blocks from the second codec region, determining to retrieve the second version of the pixel tile from the memory device.

Aspect 24. The method of Aspect 23, further comprising: determining that the reference pixels of the first version of the pixel tile were not stored in the cache while coding the one or more blocks from the second codec region; and based on a determination that the reference pixels of the first version of the pixel tile were not stored in the cache while coding the one or more blocks from the second codec region, determining to read the first version of the pixel tile from the cache.

Aspect 25. The method of any of Aspects 18 to 24, further comprising: determining the location of the pixel tile within the frame; determining that the first version of the pixel tile resides within one of the first codec region or the second codec region; generating a tag comprising a first indication of the location of the pixel tile within the frame and data indicating that the first version of the pixel tile resides within the one of the first codec region or the second codec region; and storing the tag in the cache and in association with the first version of the pixel tile.

Aspect 26. The method of Aspect 25, further comprising: generating a request to access the reference pixels of the first version of the pixel tile from the cache, wherein the request identifies a respective location of the pixel tile within the frame and a respective codec region when the first version of the pixel tile was stored in the cache; determining that both of the respective location of the pixel tile identified in the request and the respective codec region identified in the request match the location of the pixel tile identified in the tag associated with the first version of the pixel tile and the one of the first codec region or the second codec region identified in the tag; and based on the match, determining that the reference pixels of the first version of the pixel tile were stored in the cache while coding the one or more blocks from the second codec region.

Aspect 27. The method of Aspect 25, further comprising: generating a request to access the reference pixels of the first version of the pixel tile from the cache, wherein the request identifies a respective location of the pixel tile within the frame and a respective codec region when the first version of the pixel tile was stored in the cache; determining that at least one of the respective location of the pixel tile identified in the request and the respective codec region identified in the request does not match the location of the pixel tile identified in the tag associated with the first version of the pixel tile and the one of the first codec region or the second codec region identified in the tag; and based on a determination that at least one of the respective location of the pixel tile identified in the request and the respective codec region identified in the request does not match the location of the pixel tile identified in the tag associated with the first version of the pixel tile and the one of the first codec region or the second codec region identified in the tag, determining that the reference pixels of the first version of the pixel tile were not stored in the cache while coding the one or more blocks from the second codec region.

Aspect 28. The method of any of Aspects 18 to 27, further comprising: determining that the first version of the pixel tile resides within the first codec region and the second version of the pixel tile resides within the second codec region; and based on a determination that the first version of the pixel tile resides within the first codec region and the second version of the pixel tile resides within the second codec region, disabling use of the cache to store or access the first version of the pixel tile and the second version of the pixel tile.

Aspect 29. The method of any of Aspects 18 to 28, wherein the memory device comprises a random access memory (RAM) device, and wherein the RAM device is a separate memory from the cache.

Aspect 30. The method of any of Aspects 18 to 29, wherein coding the first block associated with the first codec region includes decoding the first block.

Aspect 31. The method of any of Aspects 18 to 30, wherein coding the first block associated with the first codec region includes encoding the first block.

Aspect 32. A non-transitory computer-readable medium is provided that has stored thereon instructions that, when executed by one or more processors, cause the one or more processors to perform operations according to any of Aspects 1 to 31.

Aspect 33. An apparatus for encoding or decoding (coding) video data is provided, the apparatus including one or more means for performing operations according to any of Aspects 1 to 31.

What is claimed is:

1. An apparatus for encoding or decoding (coding) video data, comprising:

a memory; and one or more processors coupled to the memory, the one or more processors configured to:

determine a first codec region associated with a first block to be coded, the first codec region being one of a plurality of codec regions of a frame, wherein each codec region among the plurality of codec regions of the frame is independently codable;

determine that reference pixels of a first version of a pixel tile were not stored in a cache while coding one or more blocks from a second codec region, wherein the cache is hosted locally on a chip of a hardware coder, and wherein the pixel tile corresponds to a location within the frame;

based on a determination that the reference pixels of the first version of the pixel tile were not stored in the cache while coding the one or more blocks from the second codec region, determine to read the first version of the pixel tile from the cache; and code the first block associated with the first codec region based at least partly on the first version of the pixel tile read from the cache.

2. The apparatus of claim 1, wherein, to determine that the reference pixels of the first version of the pixel tile were not stored in the cache while coding the one or more blocks from the second codec region, the one or more processors are configured to determine that the first version of the pixel tile is associated with the first codec region.

3. The apparatus of claim 1, wherein the one or more processors are configured to determine whether the reference pixels of the first version of the pixel tile were stored in the cache while coding the one or more blocks from the second codec region based on a tag.

4. The apparatus of claim 3, wherein the tag comprises a first indication of the location of the pixel tile within the frame and a second indication that associates the first version of the pixel tile with one of the first codec region or the second codec region.

5. The apparatus of claim 1, wherein the first codec region comprises one of a first codec tile or a first slice, and wherein the second codec region comprises one of a second codec tile or a second slice.

6. The apparatus of claim 1, wherein the one or more processors are configured to:

determine the location of the pixel tile within the frame;

determine that the first version of the pixel tile resides within one of the first codec region or the second codec region;

generate a tag comprising a first indication of the location of the pixel tile within the frame and data indicating that the first version of the pixel tile resides within the one of the first codec region or the second codec region; and store the tag in the cache and in association with the first version of the pixel tile.

7. The apparatus of claim 6, wherein the one or more processors are configured to:

generate a request to access the reference pixels of the first version of the pixel tile from the cache, wherein the request identifies a respective location of the pixel tile within the frame and a respective codec region when the first version of the pixel tile was stored in the cache;

determine that at least one of the respective location of the pixel tile identified in the request and the respective codec region identified in the request does not match the location of the pixel tile identified in the tag associated with the first version of the pixel tile and the one of the first codec region or the second codec region identified in the tag; and based on a determination that at least one of the respective location of the pixel tile identified in the request and the respective codec region identified in the request does not match the location of the pixel tile identified in the tag associated with the first version of the pixel tile and the one of the first codec region or the second codec region identified in the tag, determine that the reference pixels of the first version of the pixel tile were not stored in the cache while coding the one or more blocks from the second codec region.

8. The apparatus of claim 1, wherein the one or more processors are configured to:

determine that the first version of the pixel tile resides within the first codec region and a second version of the pixel tile resides within the second codec region; and based on a determination that the first version of the pixel tile resides within the first codec region and the second version of the pixel tile resides within the second codec region, disable use of the cache to store or access the first version of the pixel tile and the second version of the pixel tile.

9. The apparatus of claim 1, wherein the apparatus includes a decoder.

10. The apparatus of claim 9, further comprising a display configured to display one or more output pictures associated with the video data.

11. The apparatus of claim 1, wherein the apparatus includes an encoder.

12. The apparatus of claim 11, further comprising a camera configured to capture pictures associated with the video data.

13. The apparatus of claim 1, wherein the apparatus is a mobile device.

14. A method for encoding or decoding (coding) video data, comprising:

determining a first codec region associated with a first block to be coded, the first codec region being one of a plurality of codec regions of a frame, wherein each codec region among the plurality of codec regions of the frame is independently codable;

determining that reference pixels of a first version of a pixel tile were not stored in a cache while coding one or more blocks from a second codec region, wherein the cache is hosted locally on a chip of a hardware coder, and wherein the pixel tile corresponds to a location within the frame;

based on a determination that the reference pixels of the first version of the pixel tile were not stored in the cache while coding the one or more blocks from the second codec region, determining to read the first version of the pixel tile from the cache; and coding the first block associated with the first codec region based at least partly on the first version of the pixel tile read from the cache.

15. The method of claim 14, wherein determining that the reference pixels of the first version of the pixel tile were not stored in the cache while coding the one or more blocks from the second codec region comprises determining that the first version of the pixel tile is associated with the first codec region.

16. The method of claim 14, further comprising determining whether the reference pixels of the first version of the pixel tile were stored in the cache while coding the one or more blocks from the second codec region based on a tag.

17. The method of claim 16, wherein the tag comprises a first indication of the location of the pixel tile within the frame and a second indication that associates the first version of the pixel tile with one of the first codec region or the second codec region.

18. The method of claim 14, wherein the first codec region comprises one of a first codec tile or a first slice, and wherein the second codec region comprises one of a second codec tile or a second slice.

19. The method of claim 14, further comprising:

determining the location of the pixel tile within the frame;

determining that the first version of the pixel tile resides within one of the first codec region or the second codec region;

generating a tag comprising a first indication of the location of the pixel tile within the frame and data indicating that the first version of the pixel tile resides within the one of the first codec region or the second codec region; and storing the tag in the cache and in association with the first version of the pixel tile.

20. The method of claim 19, further comprising:

generating a request to access the reference pixels of the first version of the pixel tile from the cache, wherein the request identifies a respective location of the pixel tile within the frame and a respective codec region when the first version of the pixel tile was stored in the cache;

determining that at least one of the respective location of the pixel tile identified in the request and the respective codec region identified in the request does not match the location of the pixel tile identified in the tag associated with the first version of the pixel tile and the one of the first codec region or the second codec region identified in the tag; and based on a determination that at least one of the respective location of the pixel tile identified in the request and the respective codec region identified in the request does not match the location of the pixel tile identified in the tag associated with the first version of the pixel tile and the one of the first codec region or the second codec region identified in the tag, determining that the reference pixels of the first version of the pixel tile were not stored in the cache while coding the one or more blocks from the second codec region.

21. The method of claim 14, further comprising:

determining that the first version of the pixel tile resides within the first codec region and a second version of the pixel tile resides within the second codec region; and based on a determination that the first version of the pixel tile resides within the first codec region and the second version of the pixel tile resides within the second codec region, disabling use of the cache to store or access the first version of the pixel tile and the second version of the pixel tile.

22. An apparatus for encoding or decoding (coding) video data, comprising:

a memory; and one or more processors coupled to the memory, the one or more processors configured to:

determine a first codec region associated with a first block to be coded, the first codec region being one of a plurality of codec regions of a frame, wherein each codec region among the plurality of codec regions of the frame is independently codable;

determine that reference pixels of a first version of a pixel tile were stored in a cache while coding one or more blocks from a second codec region, wherein the cache is hosted locally on a chip of a hardware coder, and wherein the pixel tile corresponds to a location within the frame;

based on a determination that the reference pixels of the first version of the pixel tile were stored in the cache while coding the one or more blocks from the second codec region, determine to retrieve a second version of the pixel tile from a memory device that is external to the chip of the hardware coder, wherein the second version of the pixel tile comprises reference pixels from the first codec region that are not in the first version of the pixel tile; and code the first block associated with the first codec region based at least partly on the second version of the pixel tile retrieved from the memory device.

* * * * *